(12) United States Patent
Yue et al.

(10) Patent No.: US 10,595,241 B2
(45) Date of Patent: Mar. 17, 2020

(54) ACCESS AND HANDOVER METHOD, NETWORK SIDE DEVICE AND MOBILE TERMINAL

(71) Applicant: VIVO MOBILE COMMUNICATION CO., LTD., Chang'an DongGuan (CN)

(72) Inventors: Ran Yue, Chang'an DongGuan (CN); Yang Song, Chang'an DongGuan (CN); Fei Qin, Chang'an DongGuan (CN); Yu Ding, Chang'an DongGuan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/475,047

(22) PCT Filed: Dec. 18, 2017

(86) PCT No.: PCT/CN2017/116949
§ 371 (c)(1),
(2) Date: Jun. 28, 2019

(87) PCT Pub. No.: WO2018/121323
PCT Pub. Date: Jul. 5, 2018

(65) Prior Publication Data
US 2019/0335367 A1    Oct. 31, 2019

(30) Foreign Application Priority Data
Dec. 30, 2016 (CN) .......................... 2016 1 1262139

(51) Int. Cl.
*H04W 36/00* (2009.01)

(52) U.S. Cl.
CPC ... *H04W 36/0058* (2018.08); *H04W 36/0072* (2013.01); *H04W 36/00837* (2018.08)

(58) Field of Classification Search
CPC . H04W 36/0022; H04W 36/14; H04W 36/00; H04W 36/0016; H04W 36/0061;
(Continued)

(56) References Cited

U.S. PATENT DOCUMENTS 8,667,380 B2 * 3/2014 McLaughlin ....... H04L 63/0428
714/790
9,420,487 B2 * 8/2016 Jung ..................... H04W 24/08
(Continued)

FOREIGN PATENT DOCUMENTS

| CN | 103096372 A | 5/2013 |
|---|---|---|
| CN | 103220066 A | 7/2013 |

(Continued)

OTHER PUBLICATIONS

PCT/CN2017/116949—International Search Report dated Feb. 26, 2018, 2 pages.

*Primary Examiner* — Diane D Mizrahi
(74) *Attorney, Agent, or Firm* — Getech Law LLC; Jun Ye

(57) ABSTRACT

An access and handover method, a network side device and a mobile terminal are provided. The method includes: transmitting a measurement reference signal request message to at least one target access device when the mobile terminal meets a predetermined neighboring cell measurement condition; receiving a measurement reference signal response message from the at least one target access device, the measurement reference signal response message including measurement signal information; transmitting a first measurement configuration parameter to the mobile terminal in accordance with the measurement signal information; receiving first measurement result data from the mobile terminal; and determining a to-be-handed over access device in accordance with the first measurement result data, and (Continued)

transmitting a handover request to the to-be-handed over access device.

20 Claims, 14 Drawing Sheets

(58) Field of Classification Search
CPC ......... H04W 36/0083; H04W 36/0085; H04W 36/0088
See application file for complete search history.

(56) References Cited

U.S. PATENT DOCUMENTS 9,668,189 B2 * 5/2017 Wang .................. H04W 36/245
10,085,184 B2 * 9/2018 Liu .................... H04W 74/0891

FOREIGN PATENT DOCUMENTS

| CN | 104684019 A | 6/2015 |
| WO | 2015115737 A1 | 8/2015 |

* cited by examiner

ACCESS AND HANDOVER METHOD, NETWORK SIDE DEVICE AND MOBILE TERMINAL

CROSS-REFERENCE TO RELATED APPLICATION

The present application is the U.S. national phase of PCT Application No. PCT/CN2017/116949 filed on Dec. 18, 2017, which claims a priority of the Chinese patent application No.201611262139.9 filed on Dec. 30, 2016, which is incorporated herein by reference in its entirety.

TECHNICAL FIELD

The present disclosure relates to the field of communication technology, in particular to an access and handover method, a network side device and a mobile terminal.

BACKGROUND

In a future New Radio (NR) system, in order to achieve a downlink transmission rate of 20 Gbps and an uplink transmission rate of 10 Gbps, a high-frequency communication technique and a massive antenna technique will be introduced. A larger system bandwidth may be provided through the high-frequency communication technique, but there exist such disadvantages as large path loss, being susceptible to interference and weak link for the high-frequency communication technique. A relatively large antenna gain may be provided through the massive antenna technique. Hence, the combination of the high-frequency communication technique and the massive antenna technique becomes an inevitable trend of the future $5^{th}$-Generation (5G) mobile communication system. In order to rapidly and effectively manage beams for the high-frequency communication, i.e., fully make use of high-frequency resources, it is necessary to appropriately manage the beams.

There exist the following three modes for a downlink beam management process executed by a $3^{rd}$-Generation Partnership Project (3GPP) Radio Access Network (RAN) 1. P-1: a User Equipment (UE) measures different beams for a Transmission and Reception Point (TRP), so as to determine transmission beams for the TRP and reception beams for the UE. P-2: the reception beams for the UE remain unchanged, and the intra-TRP and/or inter-TRP transmission beams are changed, so as to enable the UE to measure different transmission beams for the TRPs. P-3: the transmission beams for the TRP remain unchanged, and the reception beams for the UE are changed, so as to enable the UE to measure different reception beams for the UE.

Depending on a current research progress, a base station may provide services to the UE through wide beams and narrow beams simultaneously. The wide beam may take an effect different from the narrow beam. Usually, the narrow beam is used for data transmission, so signal quality for the wide beams and the narrow beams is very important.

Further, for mobility measurement, as an important part of Radio Resource Management (RRM), the signal quality for the wide beams and the narrow beams needs to be taken into consideration simultaneously. Depending on the current research progress, the measurement of the wide beam is implemented through a synchronous signal, i.e., the UE measures the synchronous signal from a neighboring base station/cell, so as to measure the wide beam for the neighboring base station/cell. The narrow beam is transmitted with respect to a home UE where data is to be transmitted, and it is impossible to measure the narrow beam for the neighboring cell before the UE has accessed to the neighboring cell, so the access and handover stability of the mobile terminal is relatively poor.

SUMMARY

An object of the present disclosure is to provide an access and handover method, a network side device and a mobile terminal, so as to improve the access and handover stability of the mobile terminal.

In one aspect, the present disclosure provides in some embodiments an access and handover method for use in a source access device for a mobile terminal, including: transmitting a measurement reference signal request message to at least one target access device when the mobile terminal meets a predetermined neighboring cell measurement condition; receiving a measurement reference signal response message from the at least one target access device, the measurement reference signal response message including measurement signal information provided by the at least one target access device to the mobile terminal; transmitting a first measurement configuration parameter to the mobile terminal in accordance with the measurement signal information, the first measurement configuration parameter being used by the mobile terminal to measure a beam for the target access device; receiving first measurement result data from the mobile terminal, the first measurement result data being measurement data corresponding to the first measurement configuration parameter; and determining a to-be-handed over access device in accordance with the first measurement result data, and transmitting a handover request to the to-be-handed over access device.

In another aspect, the present disclosure provides in some embodiments an access and handover method for use in a target access device for a mobile terminal, including: receiving a measurement reference signal request message from at least one source access device; transmitting a measurement reference signal response message to the at least one source access device in accordance with the measurement reference signal request message, the measurement reference signal response message including measurement signal information provided by the target access device to the mobile terminal, the measurement signal information being used by the source access device to configure a first measurement configuration parameter for the mobile terminal; and performing a beam training operation on a corresponding beam in the measurement signal information, so as to enable the mobile terminal to perform handover measurement on the beam in accordance with the first measurement configuration parameter.

In yet another aspect, the present disclosure provides in some embodiments an access and handover method for use in a mobile terminal, including: receiving a first measurement configuration parameter from a source access device, the first measurement configuration parameter being a measurement configuration parameter configured by the source access device for the mobile terminal in accordance with measurement signal information included in a measurement reference signal response message, the measurement reference signal response message being a response message generated by a target access device upon the receipt of a measurement reference signal request message from the source access device; measuring a beam for the target access device in accordance with the first measurement configuration parameter so as to acquire first measurement result data; and transmitting the first measurement result data to the source access device, the first measurement result data being used by the source access device to control an access and handover operation made by the mobile terminal.

In still yet another aspect, the present disclosure provides in some embodiments a network side device for use in a source access device for a mobile terminal, including: a request transmission module configured to transmit a measurement reference signal request message to at least one target access device when the mobile terminal meets a predetermined neighboring cell measurement condition; a response reception module configured to receive a measurement reference signal response message from the at least one target access device, the measurement reference signal response message including measurement signal information provided by the at least one target access device to the mobile terminal; a parameter transmission module configured to transmit a first measurement configuration parameter to the mobile terminal, the first measurement configuration parameter being used by the mobile terminal to measure a beam for the target access device; a measurement result reception module configured to receive first measurement result data from the mobile terminal, the first measurement result data being measurement data corresponding to the first measurement configuration parameter; and a result processing module configured to determine a to-be-handed over access device in accordance with the first measurement result data, and transmit a handover request to the to-be-handed over access device.

In still yet another aspect, the present disclosure provides a network side device for use in a target access device for a mobile terminal, including: a request reception module configured to receive a measurement reference signal request message from at least one source access device; a response transmission module configured to transmit a measurement reference signal response message to the at least one source access device in accordance with the measurement reference signal request message, the measurement reference signal response message including measurement signal information provided by the target access device to the mobile terminal, the measurement signal information being used by the source access device to configure a first measurement configuration parameter for the mobile terminal; and a control module configured to perform a beam training operation on a corresponding beam in the measurement signal information, so as to enable the mobile terminal to perform handover measurement on the beam in accordance with the first measurement configuration parameter.

In still yet another aspect, the present disclosure provides in some embodiments a mobile terminal, including: a parameter reception module configured to receive a first measurement configuration parameter from a source access device, the first measurement configuration parameter being a measurement configuration parameter configured by the source access device for the mobile terminal in accordance with measurement signal information included in a measurement reference signal response message, the measurement reference signal response message being a response message generated by a target access device upon the receipt of a measurement reference signal request message from the source access device; a measurement module configured to measure a beam for the target access device in accordance with the first measurement configuration parameter so as to acquire first measurement result data; and a measurement result transmission module configured to transmit the first measurement result data to the source access device, the first measurement result data being used by the source access device to control an access and handover operation made by the mobile terminal.

In still yet another aspect, the present disclosure provides in some embodiments a network side device which is a source access device for a mobile terminal, including a memory, a processor, and a computer program stored in the memory and executed by the processor. The processor is configured to execute the computer program so as to implement the above-mentioned access and handover method.

In still yet another aspect, the present disclosure provides in some embodiments a network side device which is a target access device for a mobile terminal, including a memory, a processor, and a computer program stored in the memory and executed by the processor. The processor is configured to execute the computer program so as to implement the above-mentioned access and handover method.

In still yet another aspect, the present disclosure provides in some embodiments a mobile terminal, including a memory, a processor, and a computer program stored in the memory and executed by the processor. The processor is configured to execute the computer program so as to implement the above-mentioned access and handover method.

In still yet another aspect, the present disclosure provides in some embodiments a computer-readable storage medium storing therein a computer program. The computer program is executed by a processor so as to implement the above-mentioned access and handover method.

In still yet another aspect, the present disclosure provides in some embodiments a computer-readable storage medium storing therein a computer program. The computer program is executed by a processor so as to implement the above-mentioned access and handover method.

In still yet another aspect, the present disclosure provides in some embodiments a computer-readable storage medium storing therein a computer program. The computer program is executed by a processor so as to implement the above-mentioned access and handover method.

According to the embodiments of the present disclosure, when the mobile terminal meets the predetermined neighboring cell measurement condition, the source access device may: transmit the measurement reference signal request message to the at least one target access device; receive the measurement reference signal response message from the at least one target access device, the measurement reference signal response message including the measurement signal information provided by the at least one target access device to the mobile terminal; transmit the first measurement configuration parameter to the mobile terminal, the first measurement configuration parameter being used by the mobile terminal to measure the beam for the target access device; receive the first measurement result data from the mobile terminal, the first measurement result data being the measurement data corresponding to the first measurement configuration parameter; and determine the to-be-handed over access device in accordance with the first measurement result data, and transmit the handover request to the to-be-handed over access device. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
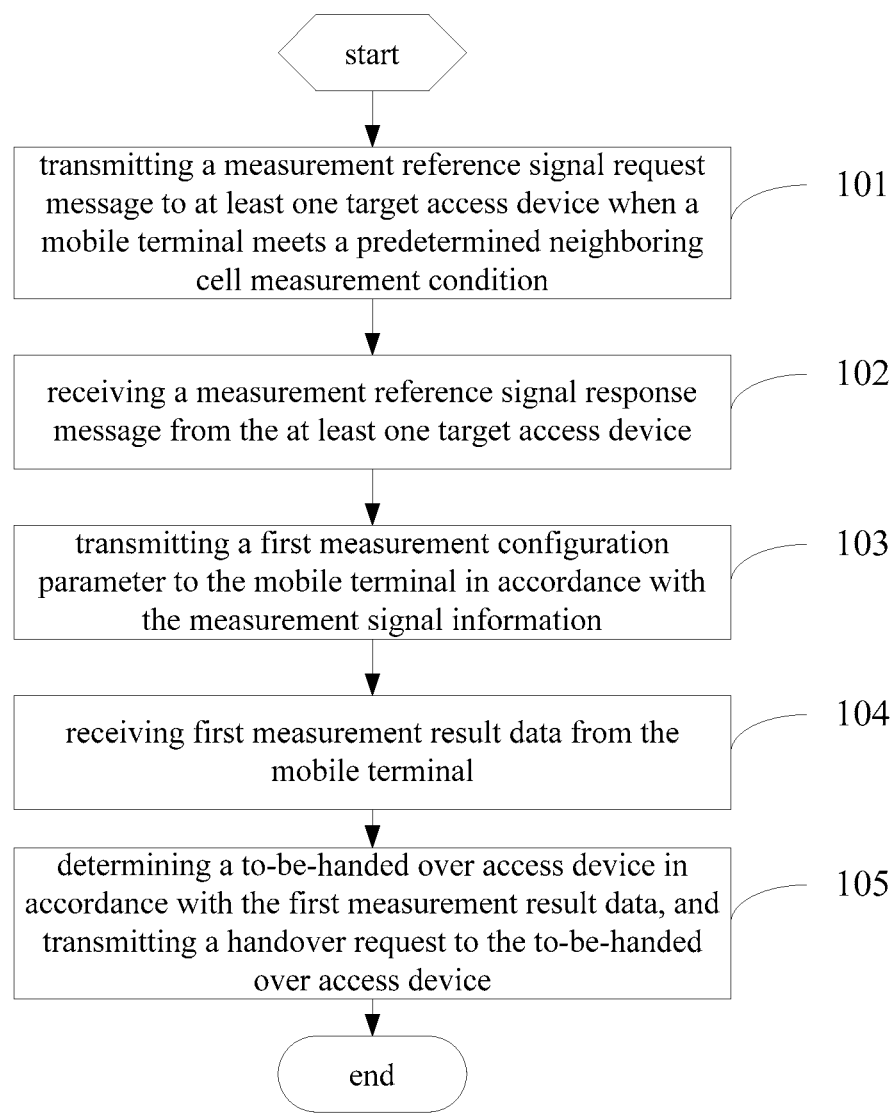
FIG. 1 is a flow chart of an access and handover method according to one embodiment of the present disclosure.

The present disclosure provides in some embodiments an access and handover method for use in a source access device for a mobile terminal. As shown in FIG. 1, the access and handover method includes the following steps.

Step 101: transmitting a measurement reference signal request message to at least one target access device when the mobile terminal meets a predetermined neighboring cell measurement condition.

The access and handover method in the embodiments of the present disclosure may be principally applied to a communication system so as to manage an access device for a mobile base station.

It should be appreciated that, the access device (also called as a Multe Fire (MF) access device) may be a base station. Of course, a type of the base station will not be particularly defined herein, and it may be a macro base station, a pico base station, a Node B (for a $3^{rd}$-Generation (3G) mobile base station), an enhanced Node B (eNB), a Femto eNB (or Home eNB (HeNB)), a relay, an access point, a Remote Radio Unit (RRU), or a Remote Radio Head (RRH).

The predetermined neighboring measurement configuration may be set according to the practical need, e.g., whether a position reported by the mobile terminal meets a predetermined condition, or whether a result of beam measurement performed by the mobile terminal on a currently-accessed source access device meets a predetermined condition, which will be described hereinafter in more details. To be specific, when the mobile terminal is located at a periphery of a signal coverage area of the source access device or at a middle position between adjacent access devices, the neighboring cell measurement condition may probably be met, and the neighboring measurement may be performed. At this time, the source access device may be triggered to transmit the measurement reference signal request message to an adjacent target access device, so as to notify the target access device that the mobile terminal needs to perform the neighboring cell measurement.

Step 102: receiving a measurement reference signal (RS) response message from the at least one target access device.

In this step, the measurement reference signal response message may include measurement signal information provided by the at least one target access device to the mobile terminal. The measurement signal information may be used by the source access device to perform measurement configuration on the mobile terminal, so as to enable the mobile terminal to measure a beam for the at least one target access device.

Step 103: transmitting a first measurement configuration parameter to the mobile terminal in accordance with the measurement signal information.

In this step, the first measurement configuration parameter may be used by the mobile terminal to measure the beam for the target access device. To be specific, the mobile terminal may perform the measurement configuration in accordance with the first measurement configuration parameter, so as to measure the beam for the target access device.

Step 104: receiving first measurement result data from the mobile terminal.

In this step, the first measurement result data may be measurement data corresponding to the first measurement configuration parameter, and it may include one or more measurement results. After the measurement, the mobile terminal may report the first measurement result data to the source access device in accordance with a preconfigured reporting mode, and the source access device may receive the first measurement result data reported by the mobile terminal. The reporting mode may be set according to the practical need, and thus will not be particularly defined herein.

Step 105: determining a to-be-handed over access device in accordance with the first measurement result data, and transmitting a handover request to the to-be-handed over access device.

The mobile terminal may select one or more of the at least one target access device as the to-be-handed over access device in accordance with the first measurement result data acquired after the measurement on the beam for the at least one target access device, and transmit the handover request to the to-be-handed over access device, until the handover procedure has been completed. A handover operation may be set according to the practical need, and thus will not be particularly defined herein.

According to the embodiments of the present disclosure, when the mobile terminal meets the predetermined neighboring cell measurement condition, the source access device may: transmit the measurement reference signal request message to the at least one target access device; receive the measurement reference signal response message from the at least one target access device, the measurement reference signal response message including the measurement signal information provided by the at least one target access device to the mobile terminal; transmit the first measurement configuration parameter to the mobile terminal based on the measurement signal information, the first measurement configuration parameter being used by the mobile terminal to measure the beam for the target access device; receive the first measurement result data from the mobile terminal, the first measurement result data being the measurement data corresponding to the first measurement configuration parameter; and determine the to-be-handed over access device in accordance with the first measurement result data, and transmit the handover request to the to-be-handed over access device. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

It should be appreciated that, in the embodiments of the present disclosure, the wide beams may be used to achieve a function of the beams of the first type, and the narrow beams may be used to achieve a function of the beams of the second type. Hence, a direction and a range of the beams of the first type and the second type will not be particularly defined herein, as long as the corresponding functions may be achieved.

Figure 2:
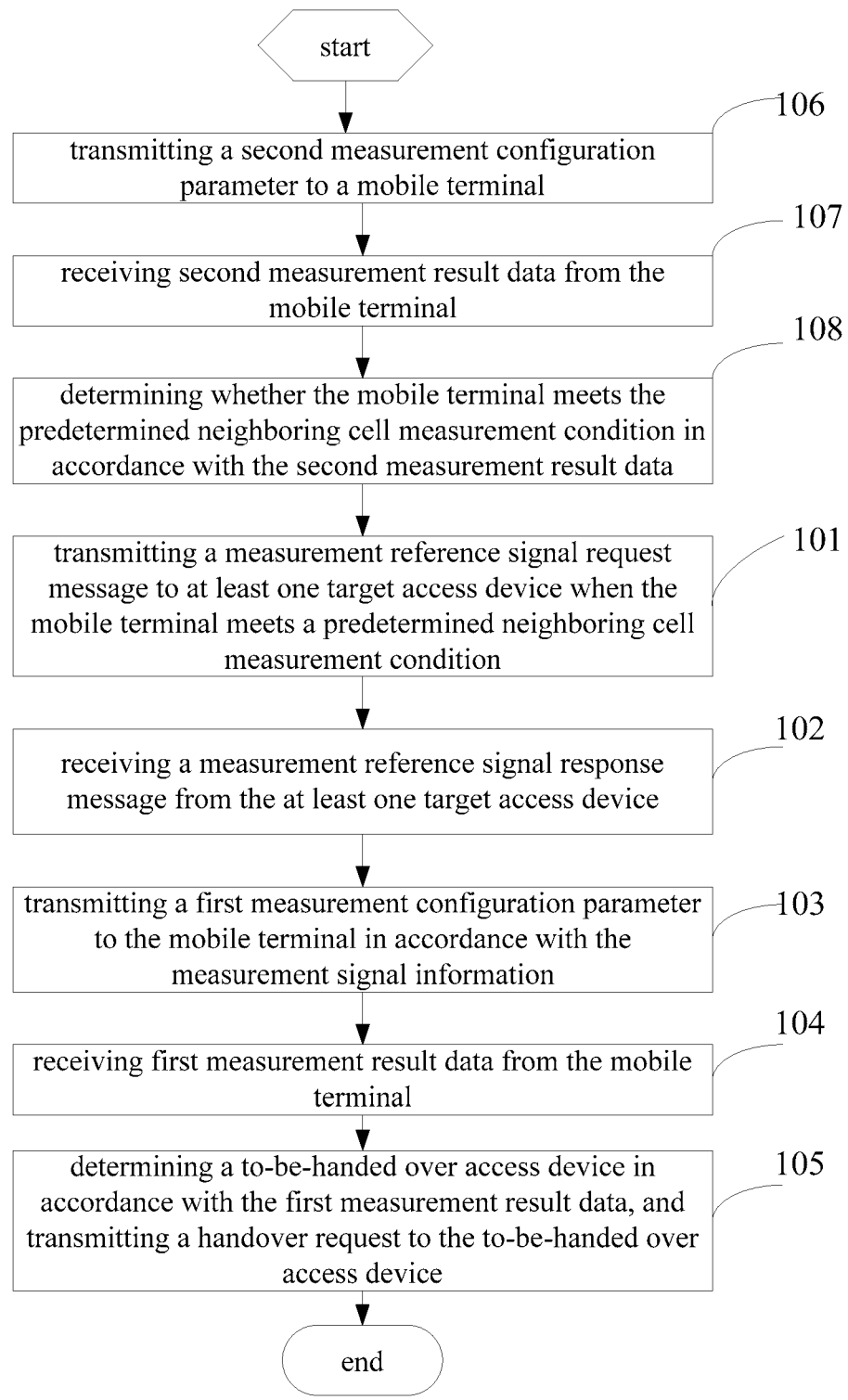
FIG. 2 is another flow chart of the access and handover method according to one embodiment of the present disclosure.

As shown in FIG. 2, prior to Step 101, the access and handover method may further include the following steps.

Step 106: transmitting a second measurement configuration parameter to the mobile terminal.

In this step, the second measurement configuration parameter may be used by the mobile terminal to measure a beam for the source access device. In the embodiments of the present disclosure, the second measurement configuration parameter may include measurement configurations about beams of a first type and a second type for the source access device. To be specific, when performing the measurement configurations on the mobile terminal, the source access device may simultaneously configure a measurement configuration parameter about the beams of the first type and a measurement configuration parameter about the beams of the second type to acquire the second measurement configuration parameter, and transmit the second measurement configuration parameter to the mobile terminal, so as to enable the mobile terminal to perform the measurement configuration.

Step 107: receiving second measurement result data from the mobile terminal.

In this step, the second measurement result data may be measurement data corresponding to the second measurement configuration parameter. After the measurement configuration in accordance with the second measurement configuration parameter from the source access device, the mobile terminal may measure the beams of the first type for the source access device and trigger the reporting of the measurement result data, or measure the beams of the second type for the source access device and trigger the reporting of the measurement result data.

To be specific, after the measurement, the mobile terminal may report measurement results about the beams of the first type and the beams of the second type separately or together. For example, the second measurement result data reported by the mobile terminal may include a measurement result about the beams of the first type and a measurement result about the beams of the second type.

Step 108: determining whether the mobile terminal meets the predetermined neighboring cell measurement condition in accordance with the second measurement result data.

In this step, whether the mobile terminal meets the predetermined neighboring cell measurement condition may be determined in accordance with the second measurement result data. For example, in the embodiments of the present disclosure, when all the second measurement result data includes the measurement results about the beams of the first type and the second type, it may be determined that the mobile terminal has met the neighboring cell measurement condition. In some other embodiments of the present disclosure, any other mode may be provided. For example, whether the mobile terminal meets the predetermined neighboring cell measurement condition may be determined by determining whether the measurement results about the beams of the first type and the second type concurrently exist in the second measurement result data. In the embodiments of the present disclosure, whether the neighboring cell measurement is to be performed may be determined in accordance with the measurement results about the beams of the first type and the second type, so the implementation thereof is simple.

Further, a mode of determining the target access device may be set according to the practical need, and detailed description will be given hereinafter in conjunction with two different schemes.

Figure 3:
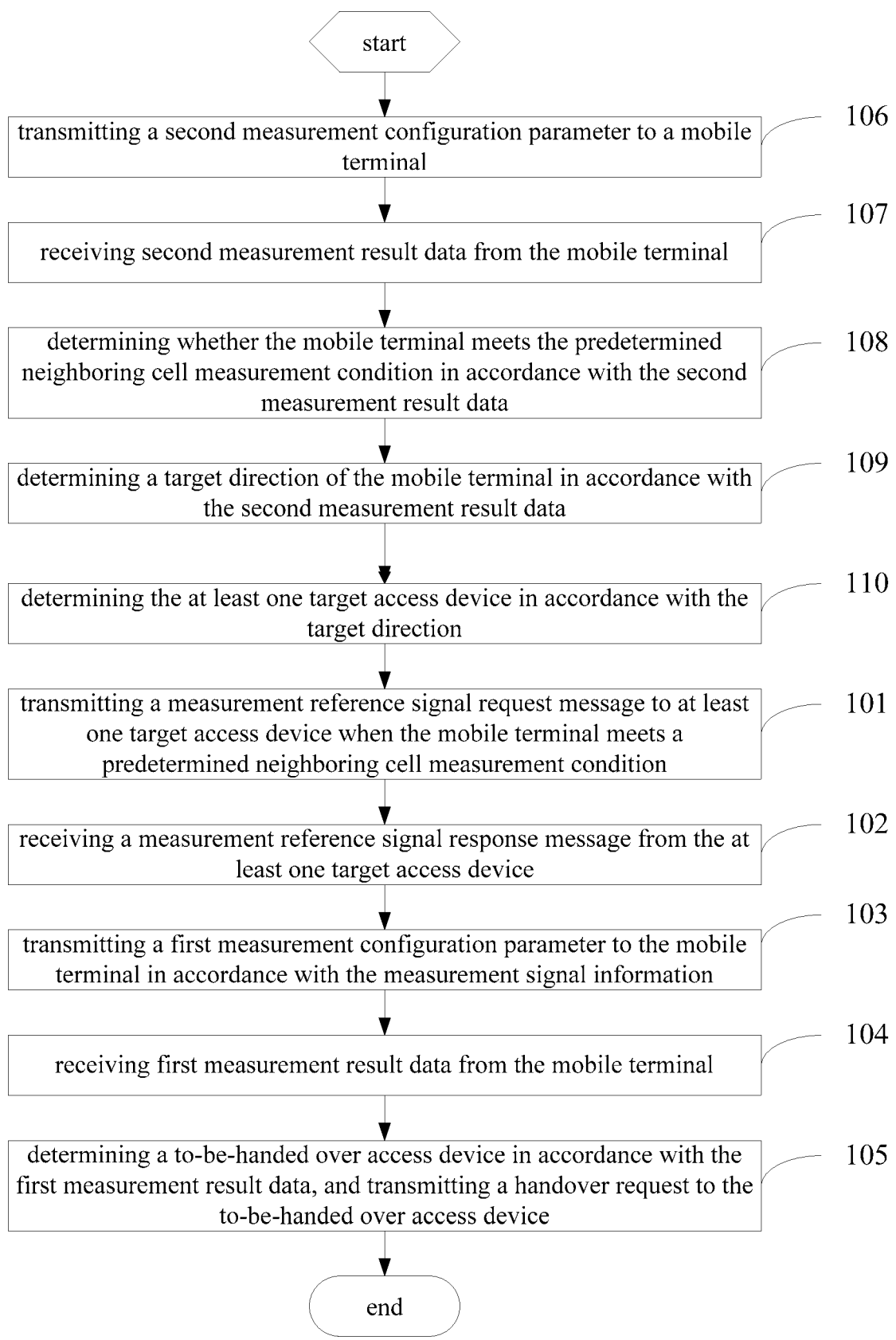
FIG. 3 is yet another flow chart of the access and handover method according to one embodiment of the present disclosure.

As shown in FIG. 3, prior to Step 101, the access and handover method may further include the following steps.

Step 109: determining a target direction of the mobile terminal in accordance with the second measurement result data.

In the embodiments of the present disclosure, upon the acquisition of the second measurement result data from the mobile terminal, the source access device may determine a current approximate direction, i.e., the target direction, of the mobile terminal in accordance with such information as a size of the received power and a direction corresponding to the beams of the first type and the second type in the second measurement result data. For example, the source access device may determine the target direction of the mobile terminal merely in accordance with the direction of the beam of the first type with optimum received power, or in accordance with the direction of the beam of the second type with optimum received power, or in accordance with both the received power of the beams of the first type and the received power of the beams of the second type, which will not be particularly defined herein.

Step 110: determining the at least one target access device in accordance with the target direction.

In this step, after the determination of the target direction of the mobile terminal in accordance with the second measurement result data, one or more target access devices may be selected in accordance with a certain principle. For example, all the access devices in this direction may be taken as the target access devices, or one or more target access devices may be selected in accordance with information about a distance between each access device and the source access device, which will not be particularly defined herein. In the embodiments of the present disclosure, the target access device may be selectively determined in accordance with the second measurement result data, so it is able to improve the accuracy of the beam measurement, thereby to reduce the signaling overhead for the system.

Figure 4:
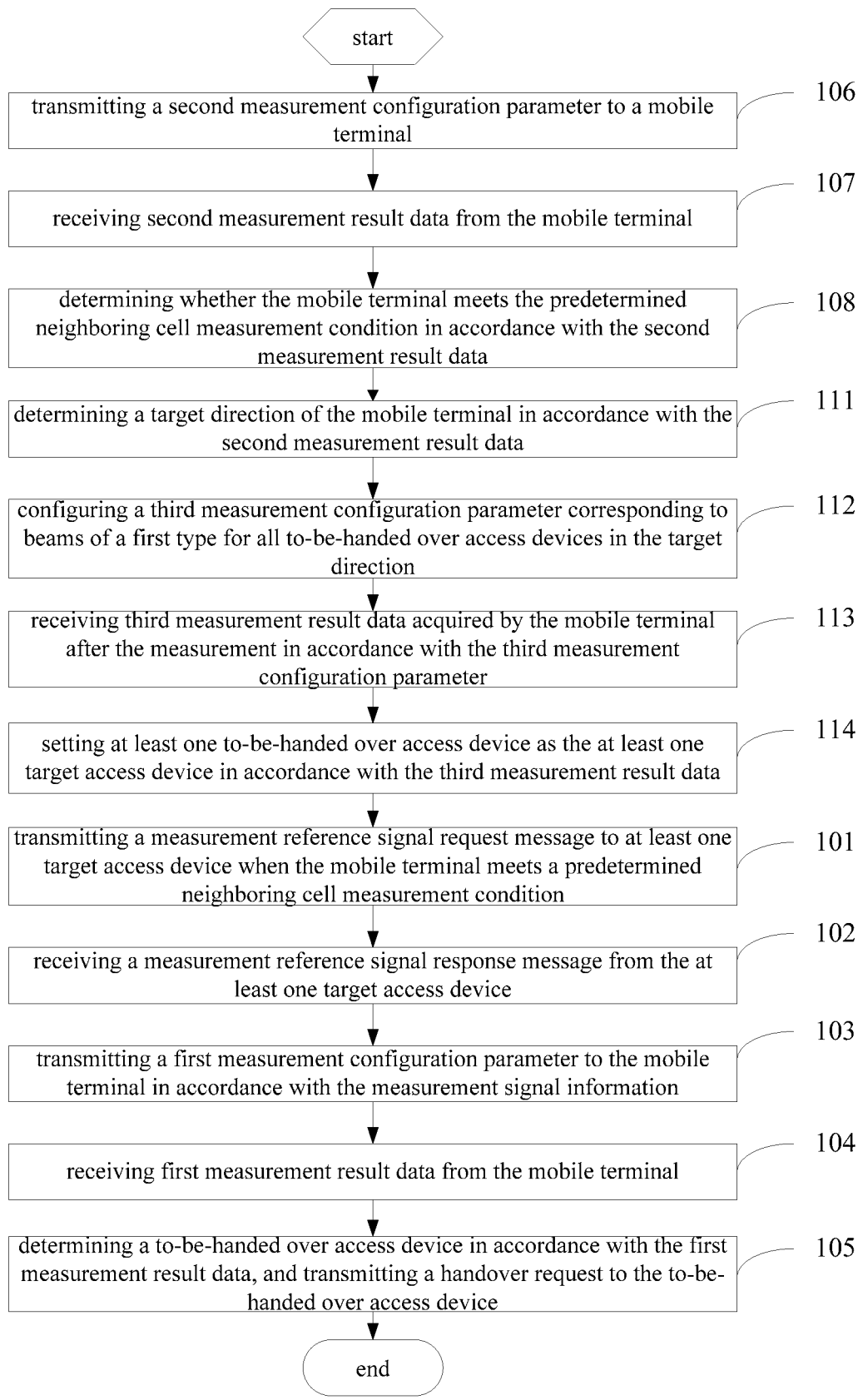
FIG. 4 is still yet another flow chart of the access and handover method according to one embodiment of the present disclosure.

As shown in FIG. 4, prior to Step 101, the access and handover method may further include the following steps.

Step 111: determining the target direction of the mobile terminal in accordance with the second measurement result data.

In the embodiments of the present disclosure, upon the acquisition of the second measurement result data from the mobile terminal, the source access device may determine a current approximate direction, i.e., the target direction, of the mobile terminal in accordance with such information as a size of the received power and a direction corresponding to the beams of the first type and the second type in the second measurement result data. For example, the source access device may determine the target direction of the mobile terminal merely in accordance with the direction of the beam of the first type with optimum received power, or in accordance with the direction of the beam of the second type with optimum received power, or in accordance with both the received power of the beams of the first type and the received power of the beams of the second type, which will not be particularly defined herein.

Step 112: configuring a third measurement configuration parameter corresponding to beams of a first type for all to-be-handed over access devices in the target direction.

In this step, the third measurement configuration parameter may be used by the mobile terminal to measure the beams of the first type for the to-be-handed over access device. For the beams of the first type, the received power may be measured through a common signal, and the common signal may be acquired by all adjacent access devices, so the source access device may directly configure the third measurement configuration parameter of the to-be-handed over access device for the mobile terminal, and transmit the third measurement configuration parameter to the mobile terminal.

Step 113: receiving third measurement result data acquired by the mobile terminal after the measurement in accordance with the third measurement configuration parameter.

In this step, the to-be-handed over access device may periodically train the beams of the first type. After the mobile terminal has performed the measurement configuration in accordance with the third measurement configuration parameter, it may directly measure the beams of the first type for all the to-be-handed over access devices in the target direction, so as to acquire the received power of the signals corresponding to the beams of the first type for all the to-be-handed over access devices. It should be appreciated that, the mobile terminal may report the received power corresponding to all the measured beams of the first type, or report the received power corresponding to one or more beams of the first type, which will not be particularly defined herein.

Step 114: setting at least one to-be-handed over access device as the at least one target access device in accordance with the third measurement result data, the target access devices being the top first predetermined quantity of devices in the to-be-handed over access devices ranked in a descending order of the measurement results about the beams of the first type.

In this step, the first predetermined quantity may be set according to the practical need, and it may be, for example, one or more than one. To be specific, upon the receipt of the third measurement result data, the source access device may rank the received power in the third measurement result data, select the top first quantity of to-be-handed over access devices with the highest received power as the target access devices. In the embodiments of the present disclosure, the target access devices may be selected from the to-be-handed over access devices in accordance with the beams of the first type, so it is able to reduce the measurement burden of the beams for the target access devices, reduce the signaling overhead for the source access device, and reduce the measurement time for the mobile terminal. In addition, the target access devices may be selected in accordance with the beams of the first type, so during the configuration of the first measurement configuration parameter, it is merely necessary to configure the measurement configuration parameter corresponding to the beams of the second type for the target access device.

Further, in order to improve the utilization of the beams, in the embodiments of the present disclosure, during the transmission of the measurement reference signal request, a recommended measurement direction may be transmitted. For example, the measurement reference signal request message may include a first initial configuration value, and the first initial configuration value may include target beam information about the measured beams of the first type in the third measurement result data. The target beam information may be used by the target access device to determine a to-be-measured beam in the measurement signal information. In a possible embodiment of the present disclosure, the target beam information may include at least one of a reference signal port, a resource number, and a reference signal retransmission sequence number.

In the embodiments of the present disclosure, the beam information about the beams of the first type for the target access device measured by the mobile terminal may be transmitted to the corresponding target access device. The target access device may determine a beam of the second type in the corresponding direction as the to-be-measured beams for the mobile terminal in accordance with the beam information about the corresponding beam of the first type, so as to perform the beam training operation accurately.

The measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may be set according to the practical need. For example, the measurement signal information may include a measurement configuration value to be configured by the target access device for the mobile terminal and/or an increment corresponding to the second initial configuration value. In other words, in the embodiments of the present disclosure, the measurement configuration value may be assigned directly, or adjusted in accordance with a recommended configuration value in the measurement reference signal request message, or a combination thereof.

In a possible embodiment of the present disclosure, the mobile terminal may configure different measurement modes for different beam training scenarios, and the to-be-handed over access device for the mobile terminal may be determined in different ways. Detailed description will be given as follows. When the first measurement configuration parameter includes a measurement configuration about the beams of the first type for the target access device but does not include a measurement configuration about the beams of the second type for the target access device, the to-be-handed over access devices may include top second predetermined quantity of devices in the target access devices ranked in a descending order of the measurement results about the beams of the first type.

In the embodiments of the present disclosure, the description will be given when the beams of the first type are wide beams and the beams of the second type are narrow beams. To be specific, the second measurement configuration parameter may be transmitted to the mobile terminal, and the mobile terminal may measure the wide beams and the narrow beams for the source access device. Upon the receipt of the measurement results corresponding to the wide beams and the narrow beams, the mobile terminal may perform the neighboring cell measurement. Next, the mobile terminal may determine at least one target access device in accordance with the measurement results corresponding to the wide beams and/or the narrow beams for the source access device, and the source access device may transmit the measurement reference signal request message to each target access device. Upon the receipt of the measurement reference signal response message from each target access device, the source access device may configure the measurement configuration parameter of the wide beams for the mobile terminal in accordance with the measurement reference signal response message. When the mobile terminal is triggered to report the measurement result, the source access device may receive the measurement results of the wide beams for the target access device acquired by the mobile terminal in accordance with the measurement configuration parameter of the wide beams. The handover request may be transmitted to the target access device corresponding to the wide beam with an optimum measurement result in accordance with the measurement results of the wide beams, so as to hand over the access device for the mobile terminal. In addition, the to-be-handed over access devices may be ranked in accordance with the measurement results, and the handover request may be transmitted, so as to hand over the mobile terminal.

When the first measurement configuration parameter includes a measurement configuration about the beams of the second type for the target access device but does not include a measurement configuration about the beams of the first type for the target access device, the to-be-handed over access devices may include top third predetermined quantity of devices in the target access devices ranked in a descending order of the measurement results about the beams of the second type.

In the embodiments of the present disclosure, the description will be given when the beams of the first type are the wide beams and the beams of the second type are the narrow beams. To be specific, the second measurement configuration parameter may be transmitted to the mobile terminal, and the mobile terminal may perform the neighboring cell measurement upon the receipt of the measurement results corresponding to the wide beams and the narrow beams. The neighboring cell measurement may be performed in various ways. For example, in one way, at least one target access device may be determined in accordance with the measurement results corresponding to the wide beams and/or narrow beams for the source access device, and then the measurement reference signal request message may be transmitted by the source access device to each target access device. Upon the receipt of the measurement reference signal response message from each target access device, the source access device may configure the measurement configuration parameter corresponding to the narrow beams for the mobile terminal in accordance with the measurement reference signal response message. When the mobile terminal is triggered to report the measurement result, the source access device may receive the measurement results of the narrow beams for the target access device acquired by the mobile terminal in accordance with the measurement configuration parameter of the narrow beams. The handover request may be transmitted to the target access device corresponding to the narrow beam with an optimum measurement result in accordance with the measurement results of the narrow beams, so as to hand over the access device for the mobile terminal. In addition, the to-be-handed over access devices may be ranked in accordance with the measurement results, and the handover request may be transmitted, so as to hand over the access device for the mobile terminal.

In a possible embodiment of the present disclosure, the approximate direction of the mobile terminal may be determined in accordance with the measurement results corresponding to the wide beams and/or the narrow beams for the source access device, and then the third measurement configuration parameter may be configured for the mobile terminal in accordance with the wide beams for all the to-be-handed over access devices in the approximate direction. When the mobile terminal is triggered to report the measurement results, the source access device may receive the measurement results corresponding to the wide beams for the target access devices in accordance with the measurement configuration parameter of the wide beams, determine at least one target access device in accordance with the measurement results corresponding to the wide beams, and transmit the measurement reference signal request message to each target access device. Upon the receipt of the measurement reference signal response message from each target access device, the source access device may configure the measurement configuration parameter of the narrow beams for the mobile terminal in accordance with the measurement reference signal response message. When the mobile terminal is triggered to report the measurement results, the source access device may receive the measurement results corresponding to the narrow beams for the target access device acquired by the mobile terminal in accordance with the measurement configuration parameter of the narrow beams. Depending on the measurement results of the narrow beams, the handover request may be transmitted to the target access device corresponding to the narrow beam with an optimum measurement result, so as to hand over the access device for the mobile terminal. In addition, the to-be-handed over access devices may be ranked in accordance with the measurement results, and the handover request may be transmitted, so as to hand over the access device for the mobile terminal. In the embodiments of the present disclosure, the to-be-handed over access device may be determined in accordance with the measurement results of the narrow beams for the target access device, so it is able to improve the handover stability.

When the first measurement configuration parameter includes the measurement configurations about the beams of the first type and the second type for the target access devices, the to-be-handed over access devices may be top second predetermined quantity of devices in the target access devices ranked in a descending order of the measurement results about the beams of the first type for the target access devices, or top third predetermined quantity of devices in the target access devices ranked in a descending order of the measurement results about the beams of the second type for the target access devices, or top third predetermined quantity of devices in the target access devices ranked in a descending order of weighted values acquired after performing weighted summation on the measurement results about the beams of the first type and the second type for the target access devices.

In the embodiments of the present disclosure, the description will be given when the beams of the first type are wide beams and the beams of the second type are narrow beams. To be specific, the second measurement configuration parameter may be transmitted to the mobile terminal, and the mobile terminal may measure the wide beams and the narrow beams for the source access device. Upon the receipt of the measurement results corresponding to the wide beams and the narrow beams, the mobile terminal may perform the neighboring cell measurement. Next, the mobile terminal may determine at least one target access device in accordance with the measurement results corresponding to the wide beams and/or the narrow beams for the source access device, and the source access device may transmit the measurement reference signal request message to each target access device. Upon the receipt of the measurement reference signal response message from each target access device, the source access device may configure the measurement configuration parameters of the wide beams and the narrow beams for the mobile terminal in accordance with the measurement reference signal response message. When the mobile terminal is triggered to report the measurement result, the source access device may receive the measurement results of the wide beams and the narrow beams for the target access device acquired by the mobile terminal in accordance with the measurement configuration parameters of the wide beams and the narrow beams. The to-be-handed over access devices may be determined in various ways in accordance with the measurement results corresponding to the wide beams and narrow beams.

For example, the handover request may be transmitted to the target access device corresponding to the wide beam with an optimum measurement result in accordance with the measurement results of the wide beams, so as to hand over the access device for the mobile terminal. In addition, the to-be-handed over access devices may be ranked in accordance with the measurement results, and the handover request may be transmitted, so as to hand over the access device for the mobile terminal.

The handover request may be transmitted to the target access device corresponding to the narrow beam with an optimum measurement result in accordance with the measurement results of the narrow beams, so as to hand over the access device for the mobile terminal. In addition, the to-be-handed over access devices may be ranked in accordance with the measurement results, and the handover request may be transmitted, so as to hand over the access device for the mobile terminal.

The to-be-handed over access devices may be ranked in accordance with the measurement results corresponding to the wide beams and the measurement results corresponding to the narrow beams. For example, a first weighted value of the wide beams and a second weighted value of the narrow beam may be pre-configured. A measurement result corresponding to a first wide beam may be multiplied by the first weighted value, and the measurement result corresponding to each narrow beam may be multiplied by the second weighted value. A value acquired after the weighted summation on the measurement results corresponding to the wide beams for a same target access device may be added to a value acquired after the weighted summation on the measurement results corresponding to the narrow beams, so as to acquire a weighted value corresponding to each target access device. This weighted value may be taken as a reference for determining the to-be-handed over access device. In the embodiments of the present disclosure, the to-be-handed over access device may be determined in accordance with the measurement results corresponding to the wide beams and the narrow beams for the target access device, so it is able to improve the handover stability.

It should be appreciated that, a communication mode between the source access device and the target access device may be set according to the practical need. In the embodiments of the present disclosure, the measurement reference signal request message and the measurement reference signal response message may be transmitted between the source access device and the target access device via an Xn interface. The Xn interface is a communication interface between base stations, and in some other embodiments of the present disclosure, the Xn interface may also be defined as any other name.

Figure 5:
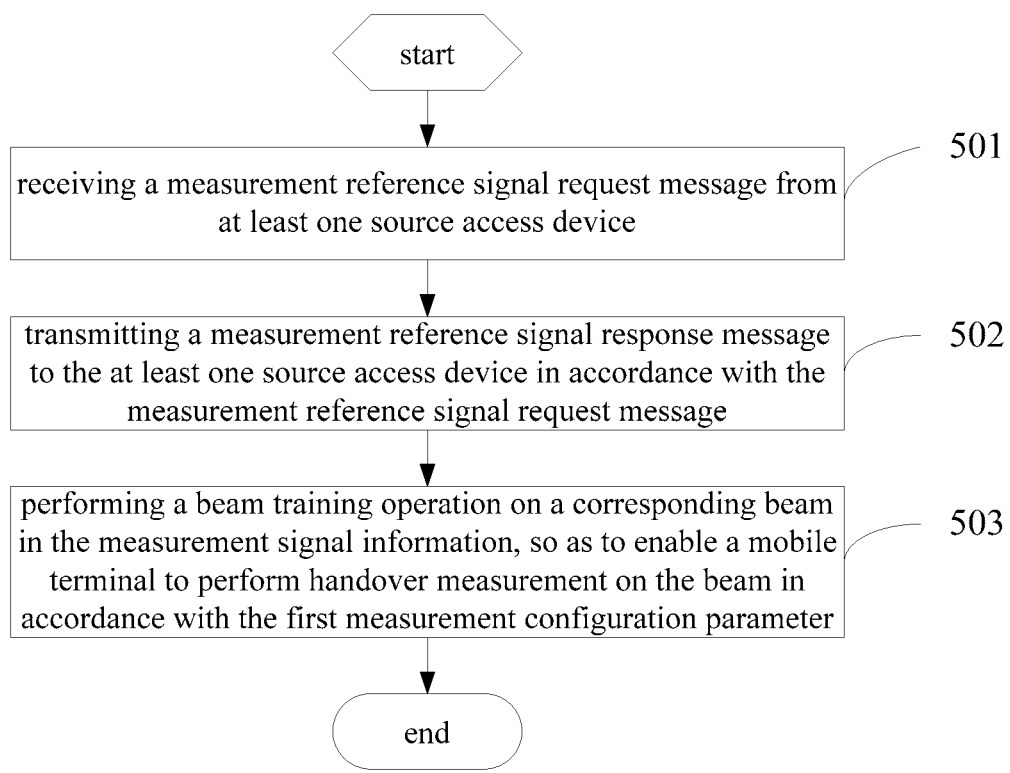
FIG. 5 is still yet another flow chart of then access and handover method according to one embodiment of the present disclosure.

The present disclosure further provides in some embodiments an access and handover method for use in a target access device for a mobile terminal. As shown in FIG. 5, the access and handover method includes the following steps.

Step 501: receiving a measurement reference signal request message from at least one source access device.

It should be appreciated that, the access device (also called as an MF access device) may be a base station. Of course, a type of the base station will not be particularly defined herein, and it may be a macro base station, a pico base station, a Node B (for a 3G mobile base station), an eNB, a Femto eNB (or HeNB), a relay, an access point, an RRU, or an RRH.

To be specific, when the mobile terminal meets a predetermined neighboring cell measurement condition, the source access device may transmit the measurement reference signal request message to the target access device. The predetermined neighboring measurement configuration may be set according to the practical need, e.g., whether a position reported by the mobile terminal meets a predetermined condition, or whether a result of beam measurement performed by the mobile terminal on a currently-accessed source access device meets a predetermined condition, which will be described hereinafter in more details. To be specific, when the mobile terminal is located at a periphery of a signal coverage area of the source access device or at a middle position between adjacent access devices, the neighboring cell measurement condition may probably be met, and the neighboring measurement may be performed. At this time, the source access device may be triggered to transmit the measurement reference signal request message to an adjacent target access device, so as to notify the target access device that the mobile terminal needs to perform the neighboring cell measurement.

Step 502: transmitting a measurement reference signal response message to the at least one source access device in accordance with the measurement reference signal request message.

In this step, the measurement reference signal response message may include measurement signal information provided by the target access device to the mobile terminal. The measurement signal information may be used by the source access device to configure a first measurement configuration parameter for the mobile terminal.

To be specific, the source access device may transmit the first measurement configuration parameter to the mobile terminal in accordance with the measurement signal information. The first measurement configuration parameter may be used by the mobile terminal to measure a beam for the target access device.

Step 503: performing a beam training operation on a corresponding beam in the measurement signal information, so as to enable the mobile terminal to perform handover measurement on the beam in accordance with the first measurement configuration parameter.

In this step, the mobile terminal may perform the measurement configuration in accordance with the first measurement configuration parameter, so as to measure the beams for the target access device. When the mobile terminal is triggered to report a measurement result, it may report a beam measurement result of the target access device to the source access device, and the source access device may perform a handover control over the mobile terminal in accordance with the measurement result.

According to the embodiments of the present disclosure, the target access device may receive the measurement reference signal request message from the at least one source access device, and transmit the measurement reference signal response message to the at least one source access device in accordance with the measurement reference signal request message. The measurement reference signal response message may include the measurement signal information provided by the target access device to the mobile terminal, and the measurement signal information may be used by the source access device to configure the first measurement configuration parameter for the mobile terminal. Then the target access device may perform the beam training operation on the corresponding beam in the measurement signal information, so as to enable the mobile terminal to perform handover measurement on the beam in accordance with the first measurement configuration parameter. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

It should be appreciated that, in the embodiments of the present disclosure, the wide beams may be used to achieve a function of the beams of the first type, and the narrow beams may be used to achieve a function of the beams of the second type. Hence, a beam direction of the beams of the first type and the second type will not be particularly defined herein, as long as the corresponding functions may be achieved.

Further, in order to improve the utilization of the beams, in the embodiments of the present disclosure, during the transmission of the measurement reference signal request, a recommended measurement direction may be transmitted. For example, the measurement reference signal request message may include a first initial configuration value, and the first initial configuration value may include target beam information about the measured beams of the first type in the third measurement result data. The target beam information may be used by the target access device to determine a to-be-measured beam in the measurement signal information. In a possible embodiment of the present disclosure, the target beam information may include at least one of a reference signal port, a resource number, and a reference signal retransmission sequence number.

In the embodiments of the present disclosure, the beam information about the beams of the first type for the target access device measured by the mobile terminal may be transmitted to the corresponding target access device. The target access device may determine a beam of the second type in the corresponding direction as the to-be-measured beams for the mobile terminal in accordance with the beam information about the corresponding beam of the first type, so as to perform the beam training operation accurately.

The measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may be set according to the practical need. For example, the measurement signal information may include a measurement configuration value to be configured by the target access device for the mobile terminal and/or an increment corresponding to the second initial configuration value. In other words, in the embodiments of the present disclosure, the measurement configuration value may be assigned directly, or adjusted in accordance with a recommended configuration value in the measurement reference signal request message, or a combination thereof.

Figure 6:
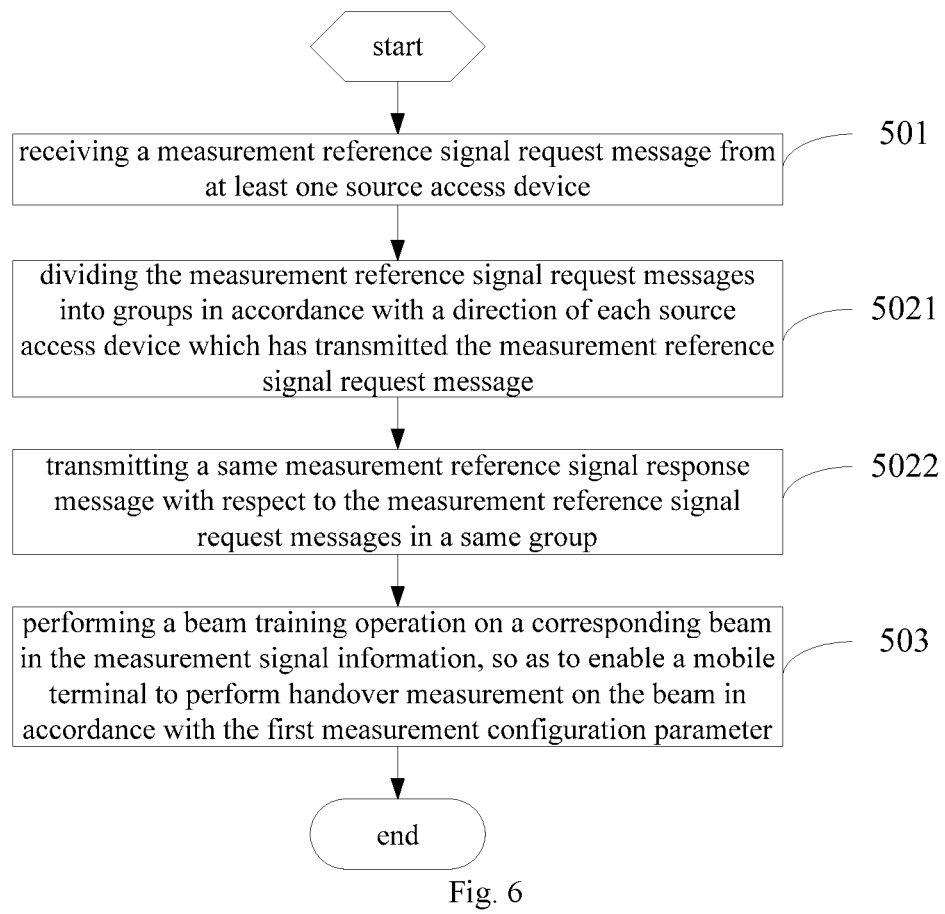
FIG. 6 is still yet another flow chart of then access and handover method according to one embodiment of the present disclosure.

As shown in FIG. 6, Step 502 may include the following steps.

Step S021: dividing the measurement reference signal request messages into groups in accordance with a direction of each source access device which has transmitted the measurement reference signal request message.

In the embodiments of the present disclosure, each target access device may receive the measurement reference signal request messages from one or more source access devices. In addition, the target access device may determine a direction of each source access device which has transmitted the measurement reference signal request message in accordance with predetermined position information or position information from the source access device, and divide the measurement reference signal request messages into groups in accordance with the direction of each source access device.

Step S022: transmitting a same measurement reference signal response message with respect to the measurement reference signal request messages in a same group.

In this step, the same measurement reference signal response message may be transmitted with respect to the measurement reference signal request messages in the same group. Because the same measurement reference signal response message is transmitted with respect to the measurement reference signal request messages in a same direction, the target access device may perform the beam training operations on a plurality of mobile terminals in a same region simultaneously, so as to improve the beam training efficiency. It should be appreciated that, the target access device may perform coordinated processing on the measurement reference signal request message from the plurality of source access devices in any other appropriate ways, which will not be particularly defined herein.

It should be appreciated that, a communication mode between the source access device and the target access device may be set according to the practical need. In the embodiments of the present disclosure, the measurement reference signal request message and the measurement reference signal response message may be transmitted between the source access device and the target access device via an Xn interface.

Figure 7:
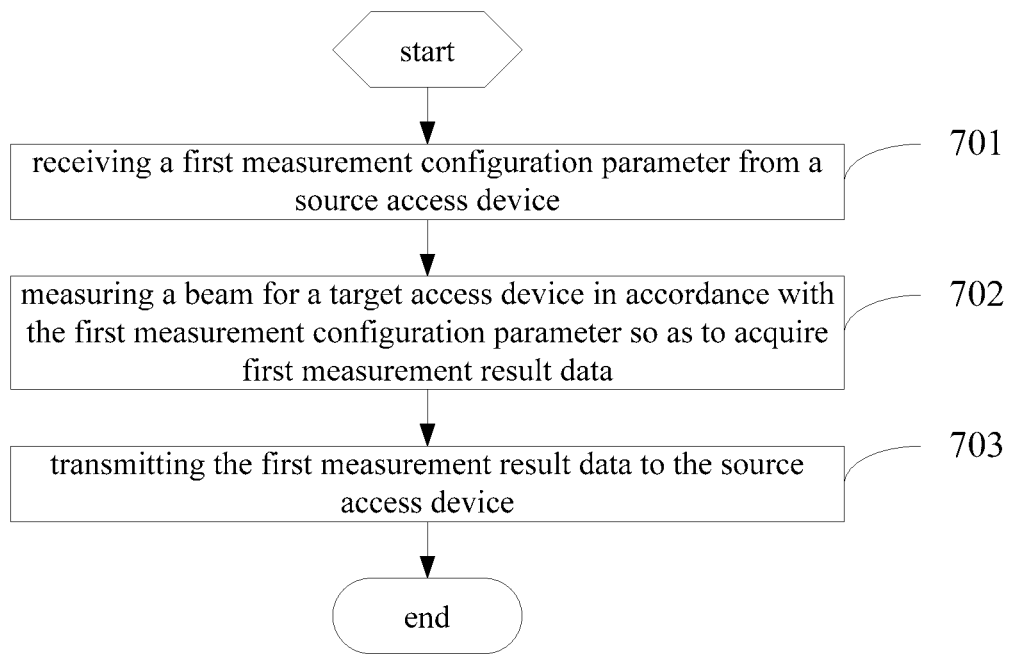
FIG. 7 is still yet another flow chart of then access and handover method according to one embodiment of the present disclosure.

The present disclosure further provides in some embodiments an access and handover method for use in a mobile terminal. As shown in FIG. 7, the access and handover method includes the following steps.

Step 701: receiving a first measurement configuration parameter from a source access device.

In this step, the first measurement configuration parameter may be a measurement configuration parameter configured by the source access device for the mobile terminal in accordance with measurement signal information included in a measurement reference signal response message, and the measurement reference signal response message may be a response message generated by a target access device upon the receipt of a measurement reference signal request message from the source access device.

It should be appreciated that, the access device (also called as an MF access device) may be a base station. Of course, a type of the base station will not be particularly defined herein, and it may be a macro base station, a pico base station, a Node B (for a 3G mobile base station), an eNB, a Femto eNB (or HeNB), a relay, an access point, an RRU, or an RRH.

To be specific, when the mobile terminal meets a predetermined neighboring cell measurement condition, the source access device may transmit the measurement reference signal request message to the target access device. The predetermined neighboring measurement configuration may be set according to the practical need, e.g., whether a position reported by the mobile terminal meets a predetermined condition, or whether a result of beam measurement performed by the mobile terminal on a currently-accessed source access device meets a predetermined condition, which will be described hereinafter in more details. To be specific, when the mobile terminal is located at a periphery of a signal coverage area of the source access device or at a middle position between adjacent access devices, the neighboring cell measurement condition may probably be met, and the neighboring measurement may be performed. At this time, the source access device may be triggered to transmit the measurement reference signal request message to an adjacent target access device, so as to notify the target access device that the mobile terminal needs to perform the neighboring cell measurement.

Step 702: measuring a beam for the target access device in accordance with the first measurement configuration parameter so as to acquire first measurement result data.

In this step, the mobile terminal may perform the measurement configuration in accordance with the first measurement configuration parameter, and measure the beam for the target access device when a corresponding measurement time is expired, so as to acquire the first measurement result data.

Step 703: transmitting the first measurement result data to the source access device.

In this step, the first measurement result data may be used by the source access device to control an access and handover operation made by the mobile terminal.

In the embodiments of the present disclosure, the mobile terminal has a reporting function. When the mobile terminal is triggered to report the measurement result data, it may transmit the first measurement result data to the source access device. The source access device may determine a to-be-handed over access device in accordance with the first measurement result data, and transmit a corresponding handover request to the mobile terminal, until a handover process has been completed.

According to the embodiments of the present disclosure, the mobile terminal may receive the first measurement configuration parameter from the source access device. The first measurement configuration parameter may be the measurement configuration parameter configured by the source access device for the mobile terminal in accordance with the measurement signal information included in a measurement reference signal response message, and the measurement reference signal response message may be the response message generated by the target access device upon the receipt of the measurement reference signal request message from the source access device. Next, the mobile terminal may measure the beam for the target access device in accordance with the first measurement configuration parameter so as to acquire the first measurement result data, and transmit the first measurement result data to the source access device. The first measurement result data may be used by the source access device to control the access and handover operation made by the mobile terminal. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

It should be appreciated that, in the embodiments of the present disclosure, the wide beams may be used to achieve a function of the beams of the first type, and the narrow beams may be used to achieve a function of the beams of the second type. Hence, a beam direction of the beams of the first type and the second type will not be particularly defined herein, as long as the corresponding functions may be achieved.

Figure 8:
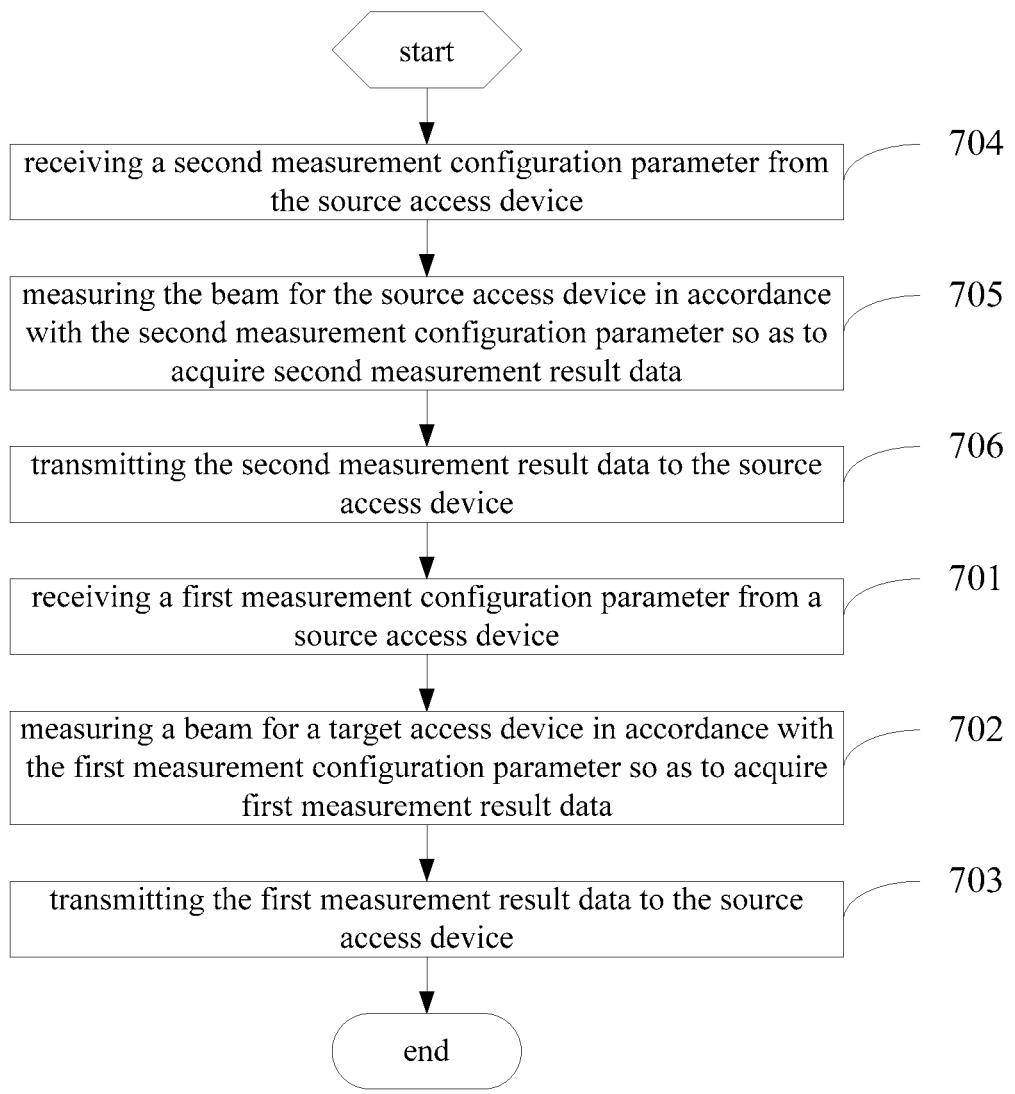
FIG. 8 is still yet another flow chart of then access and handover method according to one embodiment of the present disclosure.

As shown in FIG. 8, prior to Step 701, the access and handover method may further include the following steps.

Step 704: receiving a second measurement configuration parameter from the source access device.

In this step, the second measurement configuration parameter may be used by the mobile terminal to measure a beam for the source access device. In the embodiments of the present disclosure, the second measurement configuration parameter may include measurement configurations about beams of a first type and a second type for the source access device. To be specific, when performing the measurement configurations on the mobile terminal, the source access device may simultaneously configure a measurement configuration parameter about the beams of the first type and a measurement configuration parameter about the beams of the second type to acquire the second measurement configuration parameter, and transmit the second measurement configuration parameter to the mobile terminal.

Step 705: measuring the beam for the source access device in accordance with the second measurement configuration parameter so as to acquire second measurement result data.

Upon the receipt of the second measurement configuration parameter, the mobile terminal may perform the measurement configuration, so as to measure the beam for the source access device and report a measurement result.

Step 706: transmitting the second measurement result data to the source access device.

In this step, the second measurement result data may be used by the source access device to determine whether the measurement reference signal request message is to be transmitted to the target access device.

In the embodiments of the present disclosure, the second measurement result data may be measurement data corresponding to the second measurement configuration parameter. After the measurement configuration in accordance with the second measurement configuration parameter from the source access device, the mobile terminal may measure the beams of the first type for the source access device and trigger the reporting of the measurement result data, or measure the beams of the second type for the source access device and trigger the reporting of the measurement result data.

To be specific, after the measurement, the mobile terminal may report measurement results about the beams of the first type and the beams of the second type separately or together. For example, the second measurement result data reported by the mobile terminal may include a measurement result about the beams of the first type and a measurement result about the beams of the second type.

The source access device may determine whether the mobile terminal meets the predetermined neighboring cell measurement condition in accordance with the second measurement result data. For example, in the embodiments of the present disclosure, when all the second measurement result data received by the source access device includes the measurement results about the beams of the first type and the second type, it may be determined that the mobile terminal has met the neighboring cell measurement condition. In some other embodiments of the present disclosure, any other mode may be provided. For example, whether the mobile terminal meets the predetermined neighboring cell measurement condition may be determined by determining whether the measurement results about the beams of the first type and the second type concurrently exist in the second measurement result data. In the embodiments of the present disclosure, whether the neighboring cell measurement is to be performed may be determined in accordance with the measurement results about the beams of the first type and the second type, so the implementation thereof is simple.

Figure 9:
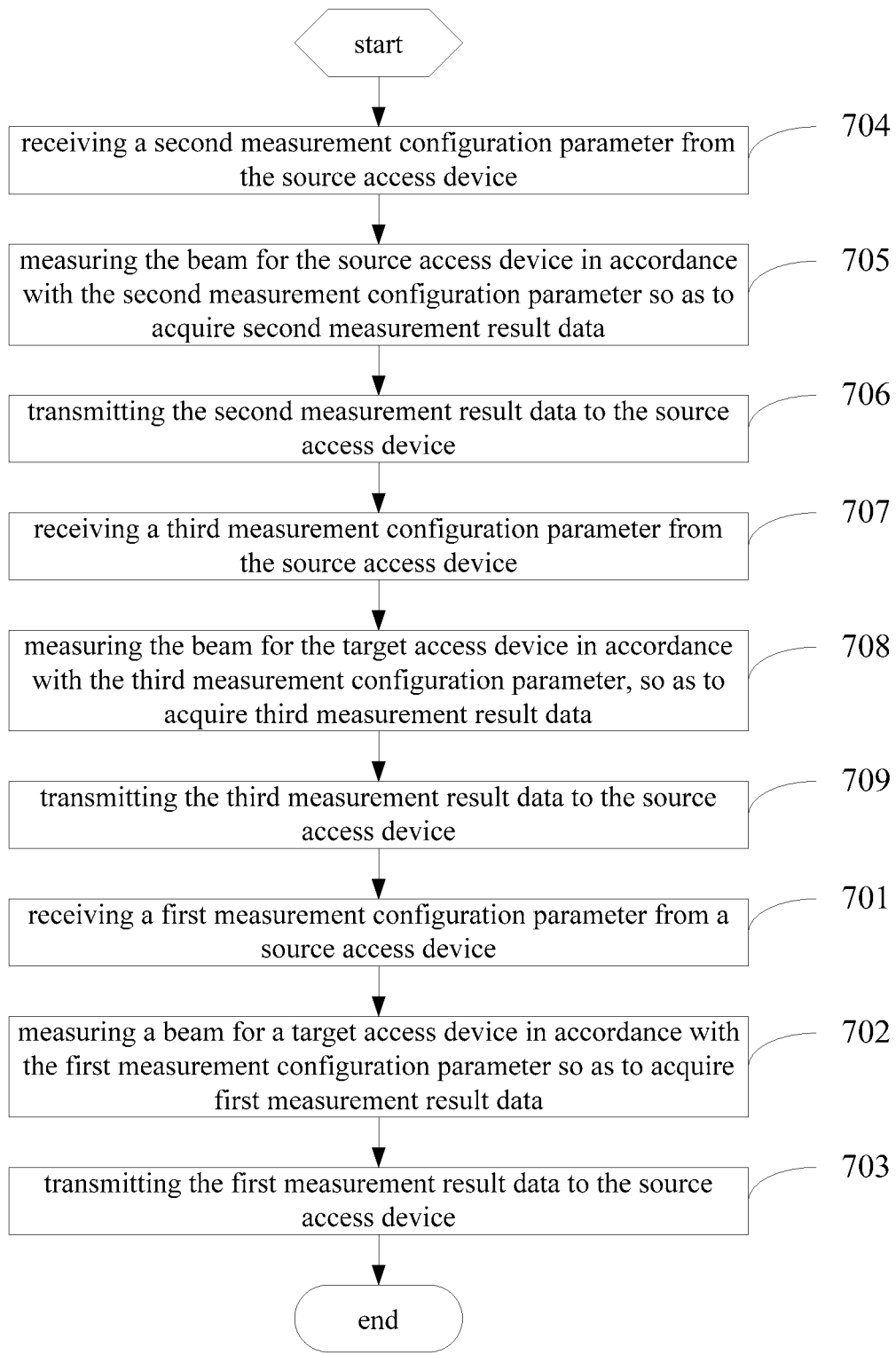
FIG. 9 is still yet another flow chart of then access and handover method according to one embodiment of the present disclosure.

As shown in FIG. 9, subsequent to Step 706, the access and handover method may further include the following steps.

Step 707: receiving a third measurement configuration parameter from the source access device.

In the embodiments of the present disclosure, upon the acquisition of the third measurement result data from the mobile terminal, the source access device may determine a current approximate direction, i.e., the target direction, of the mobile terminal in accordance with such information as a size of the received power and a direction corresponding to the beams of the first type and the second type in the second measurement result data. For example, the source access device may determine the target direction of the mobile terminal merely in accordance with the direction of the beam of the first type with optimum received power, or in accordance with the direction of the beam of the second type with optimum received power, or in accordance with both the received power of the beams of the first type and the received power of the beams of the second type, which will not be particularly defined herein.

For the beams of the first type, the received power may be measured through a common signal, and the common signal may be acquired by all adjacent access devices, so the source access device may directly configure the third measurement configuration parameter of the to-be-handed over access device for the mobile terminal, and transmit the third measurement configuration parameter to the mobile terminal.

Step 708: measuring the beam for the target access device in accordance with the third measurement configuration parameter, so as to acquire third measurement result data.

In this step, the to-be-handed over access device may periodically train the beams of the first type. After the mobile terminal has performed the measurement configuration in accordance with the third measurement configuration parameter, it may directly measure the beams of the first type for all the to-be-handed over access devices in the target direction, so as to acquire the received power of the signals corresponding to the beams of the first type for all the to-be-handed over access devices. It should be appreciated that, the mobile terminal may report the received power of all the measured beams of the first type, or report the received power of one or more beams of the first type, which will not be particularly defined herein.

Step 709: transmitting the third measurement result data to the source access device.

In this step, the third measurement result data may be used by the source access device to determine the target access device to which the measurement reference signal request message is to be transmitted.

To be specific, when the mobile terminal is triggered to report the measurement result, it may transit the acquired third measurement result data to the source access device. The source access device may set at least one to-be-handed over access device as the at least one target access device in accordance with the third measurement result data, and the target access devices are top first predetermined quantity of devices in the to-be-handed over access devices ranked in a descending order of the measurement results about the beams of the first type.

In this step, the first predetermined quantity may be set according to the practical need, and it may be, for example, one or more than one. To be specific, upon the receipt of the third measurement result data, the source access device may rank the received power in the third measurement result data, select the top first quantity of to-be-handed over access devices with the highest received power as the target access devices. In the embodiments of the present disclosure, the target access devices may be selected from the to-be-handed over access devices in accordance with the beams of the first type, so it is able to reduce the measurement burden of the beams for the target access devices, reduce the signaling overhead for the source access device, and reduce the measurement time for the mobile terminal. In addition, the target access devices may be selected in accordance with the beams of the first type, so during the configuration of the first measurement configuration parameter, it is merely necessary to configure the measurement configuration parameter corresponding to the beams of the second type for the target access device.

Further, in order to improve the utilization of the beams, in the embodiments of the present disclosure, during the transmission of the measurement reference signal request, a recommended measurement direction may be transmitted. For example, the measurement reference signal request message may include a first initial configuration value, and the first initial configuration value may include target beam information about the measured beams of the first type in the third measurement result data. The target beam information may be used by the target access device to determine a to-be-measured beam in the measurement signal information. In a possible embodiment of the present disclosure, the target beam information may include at least one of a reference signal port, a resource number, and a reference signal retransmission sequence number.

In the embodiments of the present disclosure, the beam information about the beams of the first type for the target access device measured by the mobile terminal may be transmitted to the corresponding target access device. The target access device may determine a beam of the second type in the corresponding direction as the to-be-measured beams for the mobile terminal in accordance with the beam information about the corresponding beam of the first type, so as to perform the beam training operation accurately.

The measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may be set according to the practical need. For example, the measurement signal information may include a measurement configuration value to be configured by the target access device for the mobile terminal and/or an increment corresponding to the second initial configuration value. In other words, in the embodiments of the present disclosure, the measurement configuration value may be assigned directly, or adjusted in accordance with a recommended configuration value in the measurement reference signal request message, or a combination thereof.

Figure 10:
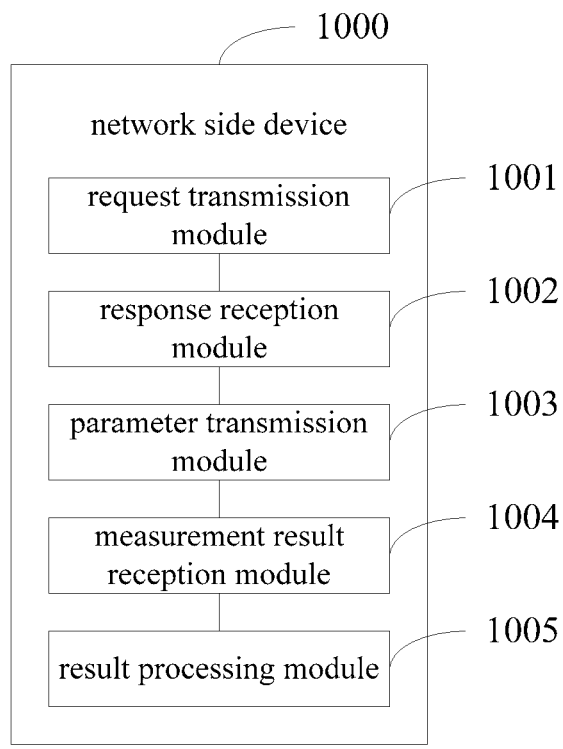
FIG. 10 is a schematic view showing a network side device according to one embodiment of the present disclosure.

The present disclosure further provides in some embodiments a network side device capable of implementing the above-mentioned access and handover method with a same technical effect. As shown in FIG. 10, the network side device 1000 is applied to a source access device for a mobile terminal, and includes a request transmission module 1001, a response reception module 1002, a parameter transmission module 1003, a measurement result reception module 1004 and a result processing module 1005. The request transmission module 1001 is configured to transmit a measurement reference signal request message to at least one target access device when the mobile terminal meets a predetermined neighboring cell measurement condition. The response reception module 1002 is configured to receive a measurement reference signal response message from the at least one target access device, and the measurement reference signal response message includes measurement signal information provided by the at least one target access device to the mobile terminal. The parameter transmission module 1003 is configured to transmit a first measurement configuration parameter to the mobile terminal, and the first measurement configuration parameter is used by the mobile terminal to measure a beam for the target access device. The measurement result reception module 1004 is configured to receive first measurement result data from the mobile terminal, and the first measurement result data is measurement data corresponding to the first measurement configuration parameter. The result processing module 1005 is configured to determine a to-be-handed over access device in accordance with the first measurement result data, and transmit a handover request to the to-be-handed over access device.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

Figure 11:
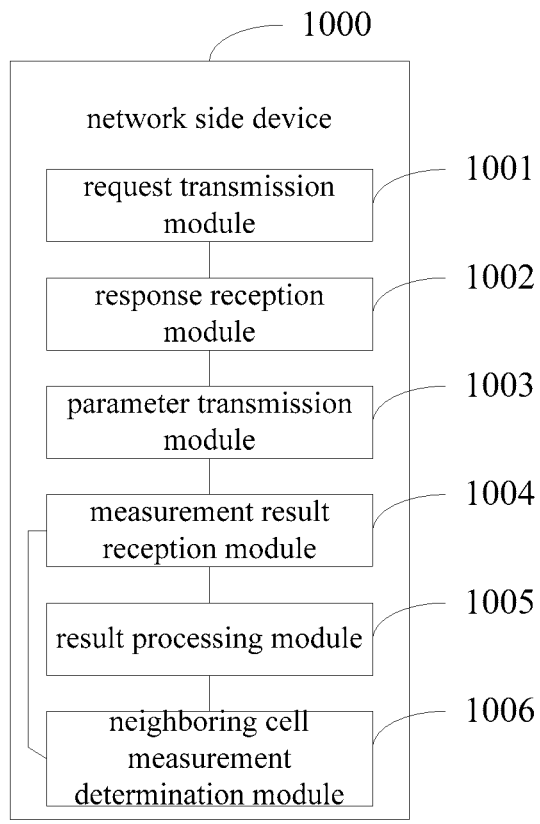
FIG. 11 is another schematic view showing the network side device according to one embodiment of the present disclosure.

In a possible embodiment of the present disclosure, as shown in FIG. 11, the network side device 1000 may further include a neighboring cell measurement determination module 1006. The parameter transmission module 1003 is further configured to transmit a second measurement configuration parameter to the mobile terminal, and the second measurement configuration parameter may be used by the mobile terminal to measure a beam for the source access device. The measurement result reception module 1004 is further configured to receive second measurement result data from the mobile terminal, and the second measurement result data may be measurement data corresponding to the second measurement configuration parameter. The neighboring cell measurement determination module 1006 is configured to determine whether the mobile terminal meets the predetermined neighboring cell measurement condition in accordance with the second measurement result data.

In a possible embodiment of the present disclosure, the second measurement configuration parameter may include measurement configurations about beams of a first type and/or a second type for the source access device. The neighboring cell measurement determination module 1006 is further configured to, when the received second measurement result data includes measurement results about the beams of the second type and measurement results about the beams of the first type, determine that the mobile terminal meets the predetermined neighboring cell measurement condition.

Figure 12:
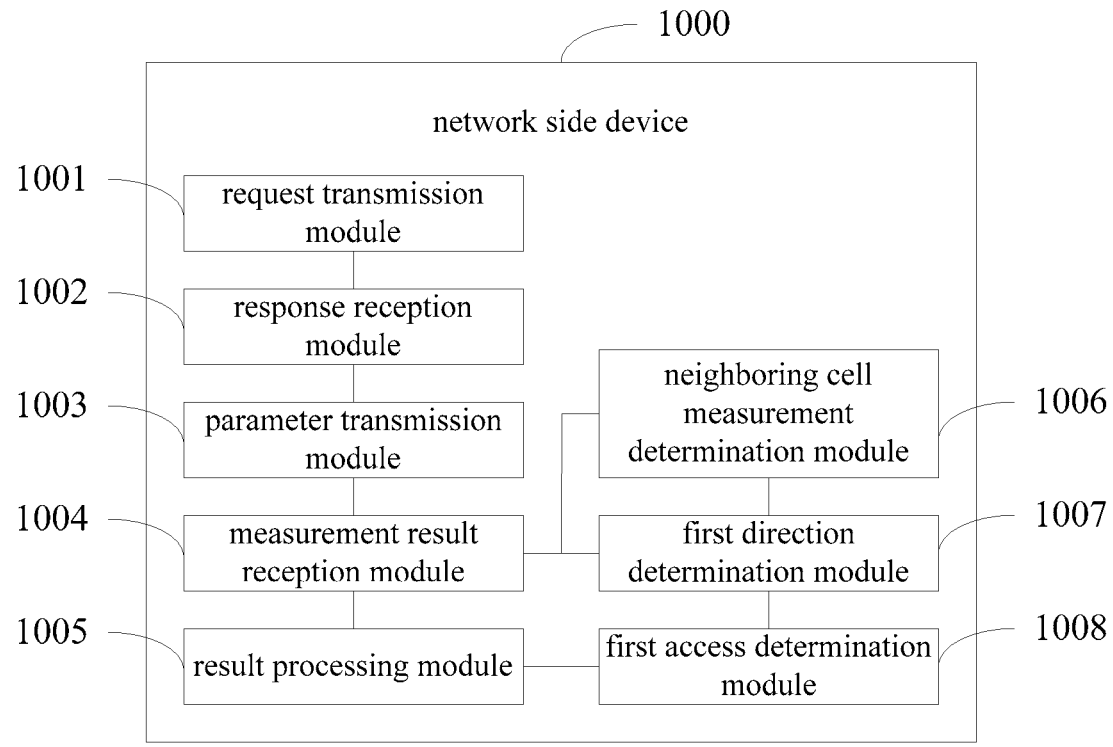
FIG. 12 is yet another schematic view showing the network side device according to one embodiment of the present disclosure.

In a possible embodiment of the present disclosure, as shown in FIG. 12, the network side device 1000 may further include a first direction determination module 1007 configured to determine a target direction of the mobile terminal in accordance with the second measurement result data, and a first access determination module 1008 configured to determine the at least one target access device in accordance with the target direction.

Figure 13:
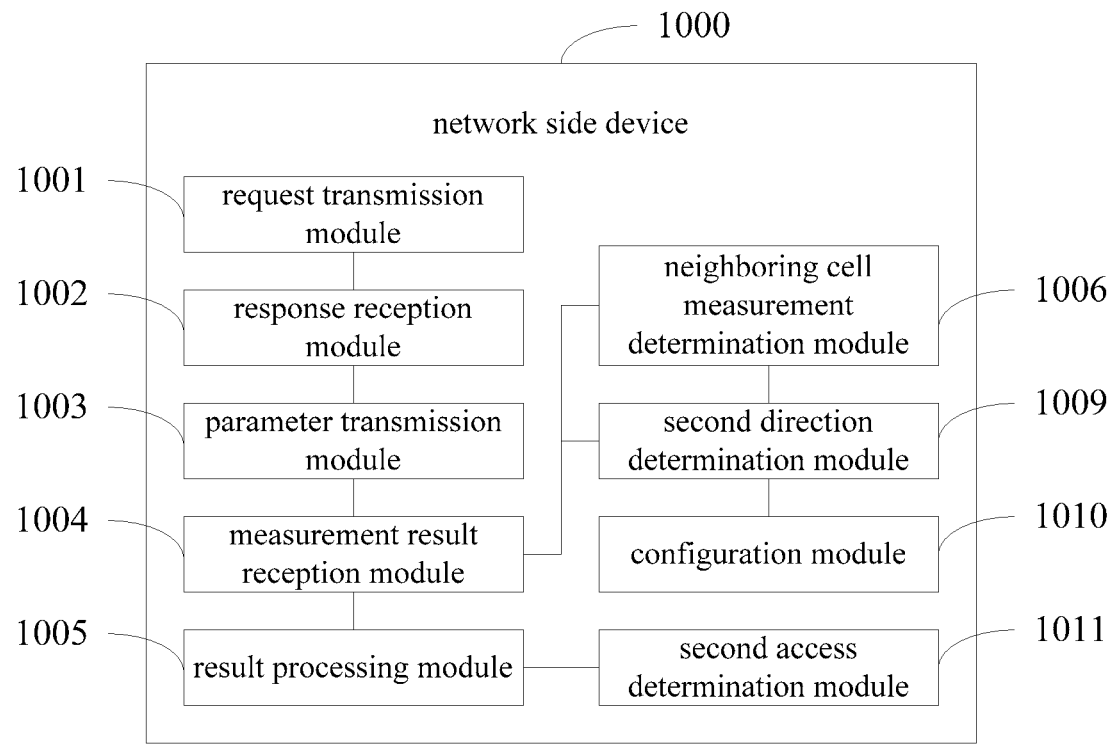
FIG. 13 is still yet another schematic view showing the network side device according to one embodiment of the present disclosure.

In a possible embodiment of the present disclosure, as shown in FIG. 13, the network side device 1000 may further include a second direction determination module 1009, a configuration module 1010 and a second access determination module 1011. The second direction determination module 1009 is configured to determine the target direction of the mobile terminal in accordance with the second measurement result data. The configuration module 1010 is configured to configure a third measurement configuration parameter corresponding to beams of a first type for all to-be-handed over access devices in the target direction, and the third measurement configuration parameter may be used by the mobile terminal to measure the beams of the first type for the to-be-handed over access device. The measurement result reception module 1004 is further configured to receive third measurement result data acquired by the mobile terminal in accordance with the third measurement configuration parameter. The second access determination module 1011 is configured to set at least one to-be-handed over access device as the at least one target access device in accordance with the third measurement result data, and the target access devices may be top first predetermined quantity of devices in the to-be-handed over access devices in a descending order of the measurement results corresponding to the beams of the first type.

In a possible embodiment of the present disclosure, the measurement reference signal request message may include a first initial configuration value, and the first initial configuration value may include target beam information about the measured beams of the first type in the third measurement result data. The target beam information may be used by the target access device to determine a to-be-measured beam in the measurement signal information.

In a possible embodiment of the present disclosure, the target beam information may include at least one of a reference signal port, a resource number, and a reference signal retransmission sequence number.

In a possible embodiment of the present disclosure, the measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may include a measurement configuration value to be configured by the target access device for the mobile terminal and/or an increment corresponding to the second initial configuration value.

In a possible embodiment of the present disclosure, when the first measurement configuration parameter includes a measurement configuration about the beams of the first type for the target access device but does not include a measurement configuration about the beams of the second type for the target access device, the to-be-handed over access devices may include top second predetermined quantity of devices in the target access devices ranked in a descending order of the measurement results about the beams of the first type.

In a possible embodiment of the present disclosure, when the first measurement configuration parameter includes a measurement configuration about the beams of the second type for the target access device but does not include a measurement configuration about the beams of the first type for the target access device, the to-be-handed over access devices may include top third predetermined quantity of devices in the target access devices ranked in a descending order of the measurement results about the beams of the second type.

In a possible embodiment of the present disclosure, when the first measurement configuration parameter includes the measurement configurations about the beams of the first type and the second type for the target access devices, the to-be-handed over access devices may be top second predetermined quantity of devices in the target access devices ranked in a descending order of the measurement results about the beams of the first type for the target access devices, or top third predetermined quantity of devices in the target access devices ranked in a descending order of the measurement results about the beams of the second type for the target access devices, or top third predetermined quantity of devices in the target access devices ranked in a descending order of weighted values acquired after performing weighted summation on the measurement results about the beams of the first type and the second type for the target access devices.

In a possible embodiment of the present disclosure, the measurement reference signal request message and the measurement reference signal response message may be transmitted between the source access device and the target access device via an Xn interface.

According to the embodiments of the present disclosure, when the mobile terminal meets the predetermined neighboring cell measurement condition, the source access device may: transmit the measurement reference signal request message to the at least one target access device; receive the measurement reference signal response message from the at least one target access device, the measurement reference signal response message including the measurement signal information provided by the at least one target access device to the mobile terminal; transmit the first measurement configuration parameter to the mobile terminal, the first measurement configuration parameter being used by the mobile terminal to measure the beam for the target access device; receive the first measurement result data from the mobile terminal, the first measurement result data being the measurement data corresponding to the first measurement configuration parameter; and determine the to-be-handed over access device in accordance with the first measurement result data, and transmit the handover request to the to-be-handed over access device. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

Figure 14:
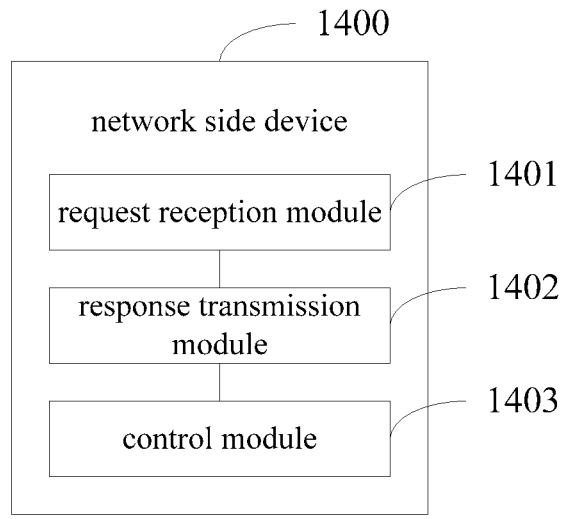
FIG. 14 is still yet another schematic view showing the network side device according to one embodiment of the present disclosure.

The present disclosure further provides in some embodiments a network side vice capable of implementing the above-mentioned access and handover method with a same technical effect. As shown in FIG. 14, the network side device 1400 is applied to a target access device for a mobile terminal, and includes a request reception module 1401, a response transmission module 1402 and a control module 1403. The request reception module 1401 is configured to receive a measurement reference signal request message from at least one source access device. The response transmission module 1402 is configured to transmit a measurement reference signal response message to the at least one source access device in accordance with the measurement reference signal request message, the measurement reference signal response message includes measurement signal information provided by the target access device to the mobile terminal, and the measurement signal information is used by the source access device to configure a first measurement configuration parameter for the mobile terminal. The control module 1403 is configured to perform a beam training operation on a corresponding beam in the measurement signal information, so as to enable the mobile terminal to perform handover measurement on the beam in accordance with the first measurement configuration parameter.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

In a possible embodiment of the present disclosure, the measurement reference signal request message may include a first initial configuration value, and the first initial configuration value may include target beam information about the beams of the first type measured by the mobile terminal for the target access device. The target beam information may be used by the target access device to determine a to-be-measured beam in the measurement signal information.

In a possible embodiment of the present disclosure, the target beam information may include at least one of a reference signal port, a resource number, and a reference signal retransmission sequence number.

In a possible embodiment of the present disclosure, the measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may include a measurement configuration value to be configured by the target access device for the mobile terminal and/or an increment corresponding to the second initial configuration value.

Figure 15:
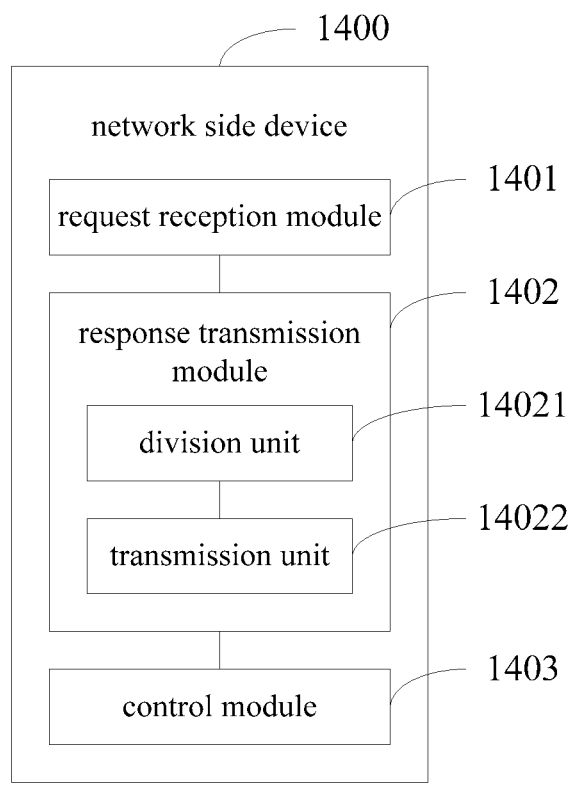
FIG. 15 is still yet another schematic view showing the network side device according to one embodiment of the present disclosure.

In a possible embodiment of the present disclosure, as shown in FIG. 15, the response transmission module 1402 may include a division unit 14021 configured to divide the measurement reference signal request messages into groups in accordance with a direction of each source access device which has transmitted the measurement reference signal request messages, and a transmission unit 14022 configured to transmit a same measurement reference signal response message with respect to the measurement reference signal request messages in a same group.

In a possible embodiment of the present disclosure, the measurement reference signal request message and the measurement reference signal response message may be transmitted between the source access device and the target access device via an Xn interface.

According to the embodiments of the present disclosure, the target access device may receive the measurement reference signal request message from the at least one source access device, and transmit the measurement reference signal response message to the at least one source access device in accordance with the measurement reference signal request message. The measurement reference signal response message may include the measurement signal information provided by the target access device to the mobile terminal, and the measurement signal information may be used by the source access device to configure the first measurement configuration parameter for the mobile terminal. Then the target access device may perform the beam training operation on the corresponding beam in the measurement signal information, so as to enable the mobile terminal to perform handover measurement on the beam in accordance with the first measurement configuration parameter. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

Figure 16:
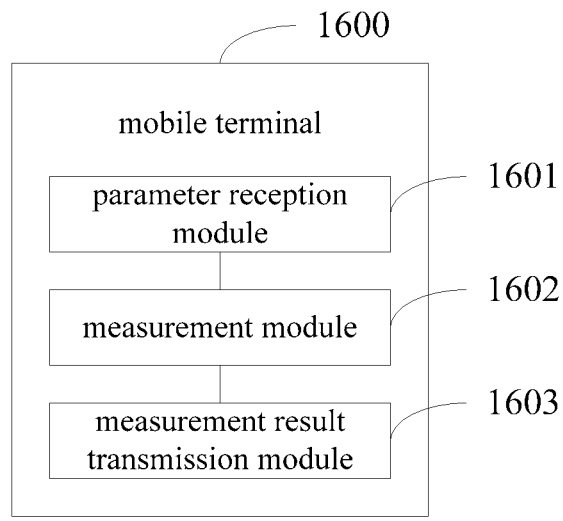
FIG. 16 is a schematic view showing a mobile terminal according to one embodiment of the present disclosure.

The present disclosure further provides in some embodiments a mobile terminal capable of implementing the above-mentioned access and handover method with a same technical effect. As shown in FIG. 16, the mobile terminal 1600 includes a parameter reception module 1601, a measurement module 1602 and a measurement result transmission module 1603. The parameter reception module 1601 is configured to receive a first measurement configuration parameter from a source access device, the first measurement configuration parameter is a measurement configuration parameter configured by the source access device for the mobile terminal in accordance with measurement signal information included in a measurement reference signal response message, and the measurement reference signal response message is a response message generated by a target access device upon the receipt of a measurement reference signal request message from the source access device. The measurement module 1602 is configured to measure a beam for the target access device in accordance with the first measurement configuration parameter so as to acquire first measurement result data. The measurement result transmission module 1603 is configured to transmit the first measurement result data to the source access device, and the first measurement result data is used by the source access device to control an access and handover operation made by the mobile terminal.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

In a possible embodiment of the present disclosure, the parameter reception module 1601 is further configured to receive a second measurement configuration parameter from the source access device. The measurement module 1602 is further configured to measure a beam for the source access device in accordance with the second measurement configuration parameter, so as to acquire second measurement result data. The measurement result transmission module 1603 is further configured to transmit the second measurement result data to the source access device, and the second measurement result data is used by the source access device to determine whether the measurement reference signal request message is to be transmitted to the target access device.

In a possible embodiment of the present disclosure, the second measurement configuration parameter may include measurement configurations about beams of a first type and beams of a second type for the source access device.

In a possible embodiment of the present disclosure, the parameter reception module 1601 is further configured to receive a third measurement configuration parameter from the source access device. The measurement module 1602 is further configured to measure the beam for the target access device in accordance with the third measurement configuration parameter so as to acquire third measurement result data. The measurement result transmission module 1603 is further configured to transmit the third measurement result data to the source access device, and the third measurement result data may be used by the source access device to determine the target access device to which the measurement reference signal request message is to be transmitted.

In a possible embodiment of the present disclosure, the measurement reference signal request message may include a first initial configuration value, and the first initial configuration value may include target beam information about the measured beams of the first type in the third measurement result data. The target beam information may be used by the target access device to determine a to-be-measured beam in the measurement signal information.

In a possible embodiment of the present disclosure, the target beam information may include at least one of a reference signal port, a resource number, and a reference signal retransmission sequence number.

In a possible embodiment of the present disclosure, the measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may include a measurement configuration value to be configured by the target access device for the mobile terminal 1600 and/or an increment corresponding to the second initial configuration value.

According to the embodiments of the present disclosure, the mobile terminal may receive the first measurement configuration parameter from the source access device. The first measurement configuration parameter may be the measurement configuration parameter configured by the source access device for the mobile terminal in accordance with the measurement signal information included in a measurement reference signal response message, and the measurement reference signal response message may be the response message generated by the target access device upon the receipt of the measurement reference signal request message from the source access device. Next, the mobile terminal may measure the beam for the target access device in accordance with the first measurement configuration parameter so as to acquire the first measurement result data, and transmit the first measurement result data to the source access device. The first measurement result data may be used by the source access device to control the access and handover operation made by the mobile terminal. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

Figure 17:
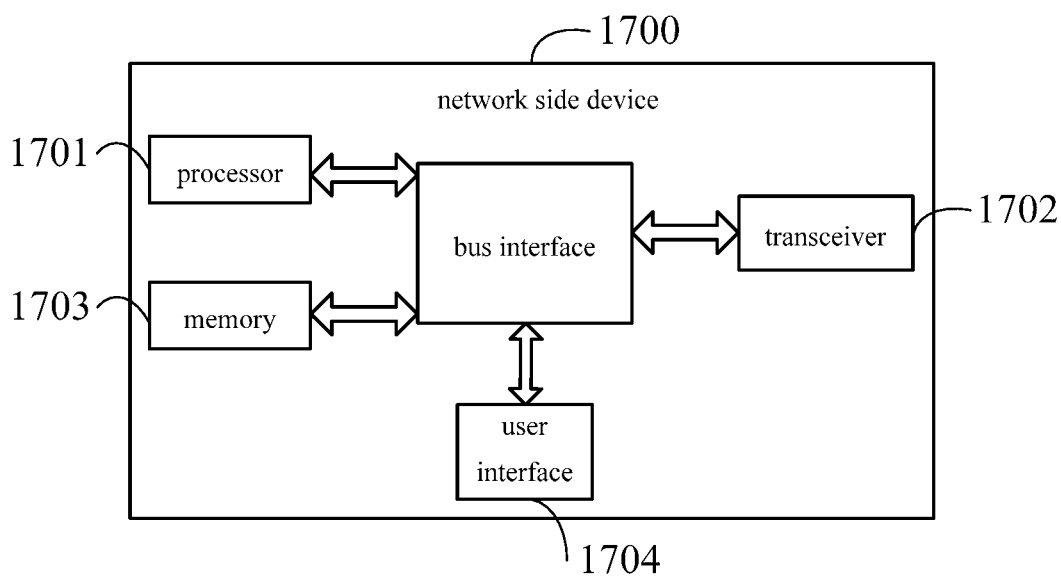
FIG. 17 is still yet another schematic view showing the network side device according to one embodiment of the present disclosure.

The present disclosure further provides in some embodiments a network side device capable of implementing the above-mentioned access and handover method with a same technical effect. As shown in FIG. 17, the network side device 1700 is applied to a source access device for a mobile terminal, and includes a processor 1701, a transceiver 1702, a memory 1703, a user interface 1704 and a bus interface. The processor 1701 is configured to read a program stored in the memory 1703, so as to: transmit a measurement reference signal request message to at least one target access device when the mobile terminal meets a predetermined neighboring cell measurement condition; receive a measurement reference signal response message from the at least one target access device, the measurement reference signal response message including measurement signal information provided by the at least one target access device to the mobile terminal; transmit a first measurement configuration parameter to the mobile terminal, the first measurement configuration parameter being used by the mobile terminal to measure a beam for the target access device; receive first measurement result data from the mobile terminal, the first measurement result data being measurement data corresponding to the first measurement configuration parameter; and determine a to-be-handed over access device in accordance with the first measurement result data, and transmit a handover request to the to-be-handed over access device.

In FIG. 17, bus architecture may include a number of buses and bridges connected to each other, so as to connect various circuits for one or more processors 1701 and one or more memories 1703. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 1702 may consist of a plurality of elements, i.e., a transmitter and a receiver for communication with any other devices over a transmission medium. With respect to different UEs, a user interface 1704 may also be provided for devices which are to be arranged inside or outside the UE, and these devices may include but not limited to a keypad, a display, a speaker, a microphone and a joystick.

The processor 1701 may take charge of managing the bus architecture as well as general processing. The memory 1703 may store therein data for the operation of the processor 1701.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

In a possible embodiment of the present disclosure, the processor 1701 is further configured to: transmit a second measurement configuration parameter to the mobile terminal, the second measurement configuration parameter being used by the mobile terminal to measure a beam for the source access device; receive second measurement result data from the mobile terminal, the second measurement result data being measurement data corresponding to the second measurement configuration parameter; and determine whether the mobile terminal meets the predetermined neighboring cell measurement condition in accordance with the second measurement result data.

In a possible embodiment of the present disclosure, the second measurement configuration parameter may include measurement configurations about beams of a first type and/or a second type for the source access device. The processor 1701 is further configured to, when the received second measurement result data includes measurement results about the beams of the second type and measurement results about the beams of the first type, determine that the mobile terminal meets the predetermined neighboring cell measurement condition.

In a possible embodiment of the present disclosure, the processor 1701 is further configured to determine a target direction of the mobile terminal in accordance with the second measurement result data, and determine the at least one target access device in accordance with the target direction.

In a possible embodiment of the present disclosure, the processor 1701 is further configured to: determine the target direction of the mobile terminal in accordance with the second measurement result data; configure a third measurement configuration parameter corresponding to beams of a first type for all to-be-handed over access devices in the target direction, the third measurement configuration parameter being used by the mobile terminal to measure the beams of the first type for the to-be-handed over access device; receive third measurement result data acquired by the mobile terminal in accordance with the third measurement configuration parameter; and set at least one to-be-handed over access device as the at least one target access device in accordance with the third measurement result data, the target access devices being top first predetermined quantity of devices in the to-be-handed over access devices in a descending order of the measurement results corresponding to the beams of the first type.

In a possible embodiment of the present disclosure, the measurement reference signal request message may include a first initial configuration value, and the first initial configuration value may include target beam information about the measured beams of the first type in the third measurement result data. The target beam information may be used by the target access device to determine a to-be-measured beam in the measurement signal information.

In a possible embodiment of the present disclosure, the target beam information may include at least one of a reference signal port, a resource number, and a reference signal retransmission sequence number.

In a possible embodiment of the present disclosure, the measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may include a measurement configuration value to be configured by the target access device for the mobile terminal and/or an increment corresponding to the second initial configuration value.

In a possible embodiment of the present disclosure, when the first measurement configuration parameter includes a measurement configuration about the beams of the first type for the target access device but does not include a measurement configuration about the beams of the second type for the target access device, the to-be-handed over access devices may include top second predetermined quantity of devices in the target access devices ranked in a descending order of the measurement results about the beams of the first type.

In a possible embodiment of the present disclosure, when the first measurement configuration parameter includes a measurement configuration about the beams of the second type for the target access device but does not include a measurement configuration about the beams of the first type for the target access device, the to-be-handed over access devices may include top third predetermined quantity of devices in the target access devices ranked in a descending order of the measurement results about the beams of the second type.

In a possible embodiment of the present disclosure, when the first measurement configuration parameter includes the measurement configurations about the beams of the first type and the second type for the target access devices, the to-be-handed over access devices may be top second predetermined quantity of devices in the target access devices ranked in a descending order of the measurement results about the beams of the first type for the target access devices, or top third predetermined quantity of devices in the target access devices ranked in a descending order of the measurement results about the beams of the second type for the target access devices, or top third predetermined quantity of devices in the target access devices ranked in a descending order of weighted values acquired after performing weighted summation on the measurement results about the beams of the first type and the second type for the target access devices.

In a possible embodiment of the present disclosure, the measurement reference signal request message and the measurement reference signal response message may be transmitted between the source access device and the target access device via an Xn interface.

According to the embodiments of the present disclosure, when the mobile terminal meets the predetermined neighboring cell measurement condition, the source access device may: transmit the measurement reference signal request message to the at least one target access device; receive the measurement reference signal response message from the at least one target access device, the measurement reference signal response message including the measurement signal information provided by the at least one target access device to the mobile terminal; transmit the first measurement configuration parameter to the mobile terminal, the first measurement configuration parameter being used by the mobile terminal to measure the beam for the target access device; receive the first measurement result data from the mobile terminal, the first measurement result data being the measurement data corresponding to the first measurement configuration parameter; and determine the to-be-handed over access device in accordance with the first measurement result data, and transmit the handover request to the to-be-handed over access device. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

Figure 18:
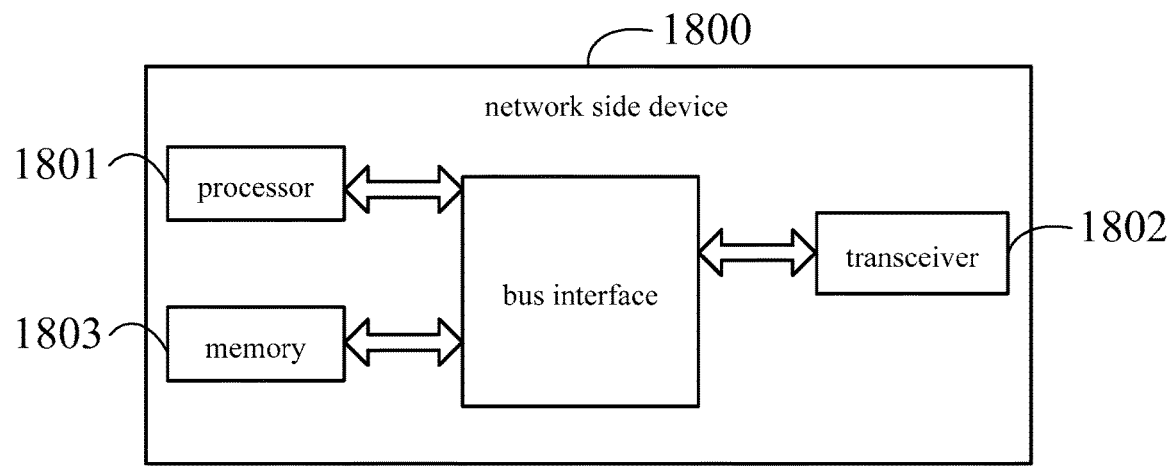
FIG. 18 is still yet another schematic view showing the network side device according to one embodiment of the present disclosure.

The present disclosure further provides in some embodiments a network side device capable of implementing the above-mentioned access and handover method with a same technical effect. As shown in FIG. 18, the network side device 1800 is applied to a target access device for a mobile terminal, and includes a processor 1801, a transceiver 1802, a memory 1803 and a bus interface. The processor 1801 is configured to read a program stored in the memory 1803, so as to: receive a measurement reference signal request message from at least one source access device; transmit a measurement reference signal response message to the at least one source access device in accordance with the measurement reference signal request message, the measurement reference signal response message including measurement signal information provided by the target access device to the mobile terminal, the measurement signal information being used by the source access device to configure a first measurement configuration parameter for the mobile terminal; and perform a beam training operation on a corresponding beam in the measurement signal information, so as to enable the mobile terminal to perform handover measurement on the beam in accordance with the first measurement configuration parameter.

In FIG. 18, bus architecture may include any number of buses and bridges connected to each other, so as to connect various circuits for one or more processors 1801 and one or more memories 1803. In addition, as is known in the art, the bus architecture may be used to connect any other circuits, such as a circuit for a peripheral device, a circuit for a voltage stabilizer and a power management circuit. The bus interface may be provided, and the transceiver 1802 may consist of a plurality of elements, i.e., a transmitter and a receiver for communication with any other devices over a transmission medium.

The processor 1801 may take charge of managing the bus architecture as well as general processing. The memory 1803 may store therein data for the operation of the processor 1801.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

In a possible embodiment of the present disclosure, the measurement reference signal request message may include a first initial configuration value, and the first initial configuration value may include target beam information about the measured beams of the first type in the third measurement result data. The target beam information may be used by the target access device to determine a to-be-measured beam in the measurement signal information.

In a possible embodiment of the present disclosure, the target beam information may include at least one of a reference signal port, a resource number, and a reference signal retransmission sequence number.

In a possible embodiment of the present disclosure, the measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may include a measurement configuration value to be configured by the target access device for the mobile terminal and/or an increment corresponding to the second initial configuration value.

In a possible embodiment of the present disclosure, the processor 1801 is further configured to divide the measurement reference signal request messages into groups in accordance with a direction of each source access device which has transmitted the measurement reference signal request messages, and transmit a same measurement reference signal response message with respect to the measurement reference signal request messages in a same group.

In a possible embodiment of the present disclosure, the measurement reference signal request message and the measurement reference signal response message may be transmitted between the source access device and the target access device via an Xn interface.

According to the embodiments of the present disclosure, the target access device may receive the measurement reference signal request message from the at least one source access device, and transmit the measurement reference signal response message to the at least one source access device in accordance with the measurement reference signal request message. The measurement reference signal response message may include the measurement signal information provided by the target access device to the mobile terminal, and the measurement signal information may be used by the source access device to configure the first measurement configuration parameter for the mobile terminal. Then the target access device may perform the beam training operation on the corresponding beam in the measurement signal information, so as to enable the mobile terminal to perform handover measurement on the beam in accordance with the first measurement configuration parameter. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

Figure 19:
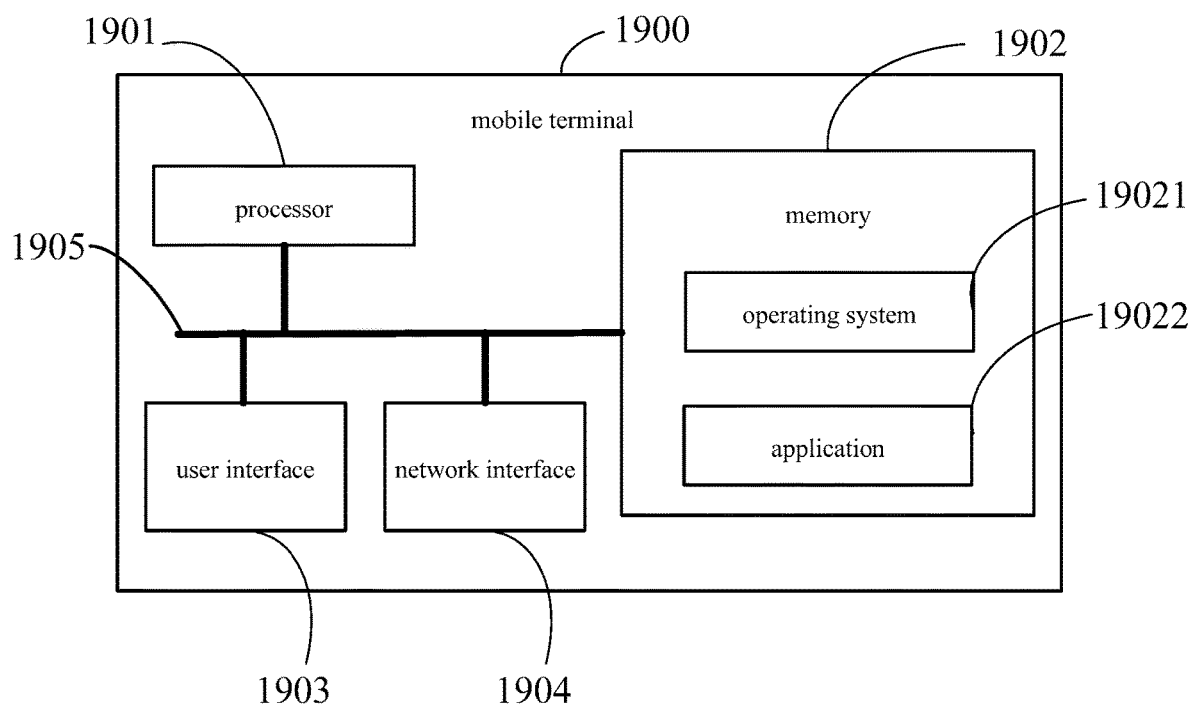
FIG. 19 is another schematic view showing the mobile terminal according to one embodiment of the present disclosure.

The present disclosure further provides in some embodiments a mobile terminal capable of implementing the above-mentioned access and handover method with a same technical effect. As shown in FIG. 19, the mobile terminal 1900 includes at least one processor 1901, a memory 1902, at least one network interface 1904 and a user interface 1903. The components of the mobile terminal 1900 may be coupled together through a bus system 1905. It should be appreciated that, the bus system 1905 is configured to achieve connection and communication among the components. Apart from a data bus, the bus system 1905 may further include a power source bus, a control bus and a state signal bus. For clarification, all these buses in FIG. 19 may be collectedly called as bus system 1905.

The user interface 1903 may include a display, a keyboard or a pointing device (e.g., mouse, track ball, touch plate or touch panel).

It should be appreciated that, the memory 1902 may be a volatile memory, a nonvolatile memory or both. The non-volatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1902 intends to include, but not limited to, the above-mentioned and any other appropriate memories.

In a possible embodiment of the present disclosure, the following elements may be stored in the memory 1902: an executable module or data structure, a subset or an extended set thereof, an operating system 19021 and an application 19022.

The operating system 19021 may include various system programs, e.g., a framework layer, a core layer and a driving layer, so as to implement various basic services and process hardware-based tasks. The application 19022 may include various applications, e.g., Media Player and Browser, so as to implement various application services. The programs for implementing the above-mentioned method may be included in the application 19022.

In the embodiments of the present disclosure, through calling a program or instruction stored in the memory 1902, e.g., a program or instruction stored in the application 19022, the processor 1901 is configured to: receive a first measurement configuration parameter from a source access device, the first measurement configuration parameter being a measurement configuration parameter configured by the source access device for the mobile terminal 1900 in accordance with measurement signal information included in a measurement reference signal response message, the measurement reference signal response message being a response message generated by a target access device upon the receipt of a measurement reference signal request message from the source access device; measure a beam for the target access device in accordance with the first measurement configuration parameter so as to acquire first measurement result data; and transmit the first measurement result data to the source access device, the first measurement result data being used by the source access device to control an access and handover operation made by the mobile terminal 1900.

The above-mentioned method may be applied to, or implemented by, the processor 1901. The processor 1901 may be an integrated circuit (IC) having a signal processing capability. During the implementation, the steps of the above-mentioned method may be completed through an integrated logic circuit of hardware in the processor 1901 or instructions in the form of software. The processor 1901 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1902, and the processor 1901 may read information stored in the memory 1902 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

In a possible embodiment of the present disclosure, the processor 1901 is further configured to: receive a second measurement configuration parameter from the source access device; measure a beam for the source access device in accordance with the second measurement configuration parameter, so as to acquire second measurement result data; and transmit the second measurement result data to the source access device. The second measurement result data may be used by the source access device to determine whether the measurement reference signal request message is to be transmitted to the target access device.

In a possible embodiment of the present disclosure, the second measurement configuration parameter may include measurement configurations about beams of a first type and beams of a second type for the source access device.

In a possible embodiment of the present disclosure, the processor 1901 is further configured to: receive a third measurement configuration parameter from the source access device; measure the beam for the target access device in accordance with the third measurement configuration parameter so as to acquire third measurement result data; and transmit the third measurement result data to the source access device. The third measurement result data may be used by the source access device to determine the target access device to which the measurement reference signal request message is to be transmitted.

In a possible embodiment of the present disclosure, the measurement reference signal request message may include a first initial configuration value, and the first initial configuration value may include target beam information about the measured beams of the first type in the third measurement result data. The target beam information may be used by the target access device to determine a to-be-measured beam in the measurement signal information.

In a possible embodiment of the present disclosure, the target beam information may include at least one of a reference signal port, a resource number, and a reference signal retransmission sequence number.

In a possible embodiment of the present disclosure, the measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may include a measurement configuration value to be configured by the target access device for the mobile terminal 1900 and/or an increment corresponding to the second initial configuration value.

According to the embodiments of the present disclosure, the mobile terminal may receive the first measurement configuration parameter from the source access device. The first measurement configuration parameter may be the measurement configuration parameter configured by the source access device for the mobile terminal in accordance with the measurement signal information included in a measurement reference signal response message, and the measurement reference signal response message may be the response message generated by the target access device upon the receipt of the measurement reference signal request message from the source access device. Next, the mobile terminal may measure the beam for the target access device in accordance with the first measurement configuration parameter so as to acquire the first measurement result data, and transmit the first measurement result data to the source access device. The first measurement result data may be used by the source access device to control the access and handover operation made by the mobile terminal. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

Figure 20:
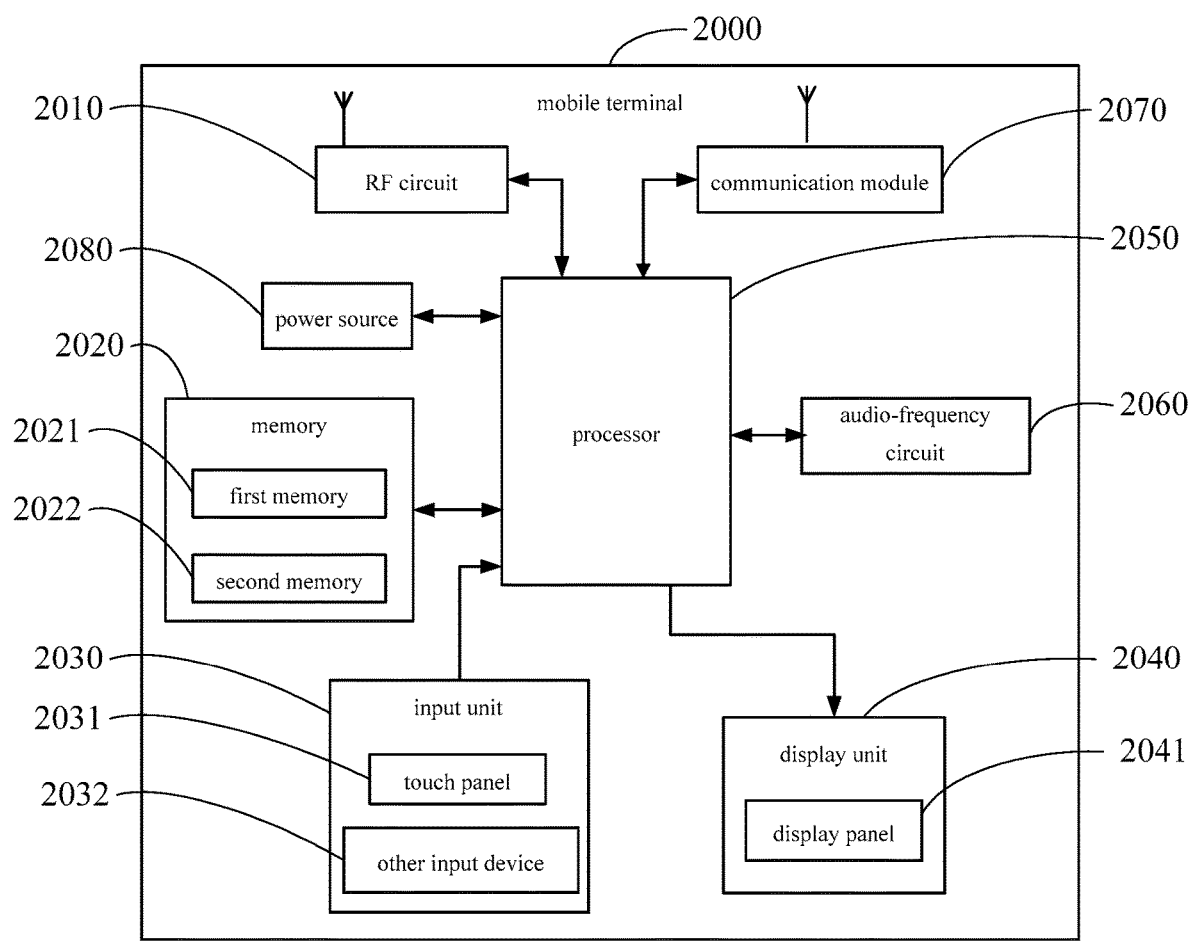
FIG. 20 is yet another schematic view showing the mobile terminal according to one embodiment of the present disclosure.

The present disclosure further provides in some embodiments a mobile terminal capable of implementing the above-mentioned access and handover method with a same technical effect. As shown in FIG. 20, the mobile terminal 2000 may include a radio frequency (RF) circuit 2010, a memory 2020, an input unit 2030, a display unit 2040, a processor 2050, an audio-frequency circuit 2060, a communication module 2070, a power source 2080 and a camera.

The input unit 2030 is configured to receive digital or character information inputted by a user, and generate a signal input related to user settings and function control of the mobile terminal 2000. To be specific, the input unit 2030 may include a touch panel 2031, also called as touch screen, which is configured to collect a touch operation made by the user on or in proximity to the touch panel (e.g., an operation made by the user through any appropriate object or attachment (e.g., finger or stylus) on or in the proximity to the touch panel 2031), and drive a corresponding connection device in accordance with a predetermined program. In a possible embodiment of the present disclosure, the touch panel 1431 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 2050, and receive and execute a command from the processor 2050. In addition, the touch panel 2031 may be of a resistive type, a capacitive type, an infrared type or a surface acoustic wave (SAW) type. The input unit 2030 may further include an input device 2032 which includes, but not limited to, a physical keyboard, a functional button (e.g., a volume control button or an on/off button), a trackball, a mouse, and a joystick.

The display unit 2040 is configured to display information inputted by the user or information to be presented to the user, and various interfaces for the mobile terminal 2000, and it may include a display panel 2041. In a possible embodiment of the present disclosure, the display panel

2041 may be a Liquid Crystal Display (LCD) panel or an Organic Light-Emitting Diode (OLED) panel.

It should be appreciated that, the touch panel 2031 may cover the display panel 2041, so as to form a touch display panel. When the touch operation made on or in proximity to the touch display panel has been detected, the touch information may be transmitted to the processor 2050 so as to determine a type of a touch event. Then, the processor 2050 may provide corresponding visual output on the touch display panel in accordance with the type of the touch event.

The processor 2050 may be a control center of the mobile terminal 2000, and connected to each member of the entire mobile terminal via various interfaces and lines. The processor 2050 is configured to run or execute software programs and/or modules stored in a first memory 2021, and call data stored in a second memory 2022, so as to achieve various functions of the mobile terminal 2000 and process the data, thereby to monitor the mobile terminal 2000. In a possible embodiment of the present disclosure, the processor 2050 may include one or more processing units.

In the embodiments of the present disclosure, the processor 2050 is configured to call the software program and/or module stored in the first memory 2021 and/or the data stored in the second memory 2022, so as to: receive a first measurement configuration parameter from a source access device, the first measurement configuration parameter being a measurement configuration parameter configured by the source access device for the mobile terminal 2000 in accordance with measurement signal information included in a measurement reference signal response message, the measurement reference signal response message being a response message generated by a target access device upon the receipt of a measurement reference signal request message from the source access device; measure a beam for the target access device in accordance with the first measurement configuration parameter so as to acquire first measurement result data; and transmit the first measurement result data to the source access device, the first measurement result data being used by the source access device to control an access and handover operation made by the mobile terminal 2000.

In a possible embodiment of the present disclosure, the first measurement configuration parameter may include measurement configurations about beams of a first type and/or a second type for the target access device. The beams of the first type may include beams capable of being measured in accordance with a common signal to acquire received power, and the beams of the second type may include beams capable of being measured in accordance with a dedicated reference signal to acquire the received power.

In a possible embodiment of the present disclosure, the beams of the first type may include wide beams, and the beams of the second type may include narrow beams.

In a possible embodiment of the present disclosure, the processor 2050 is further configured to: receive a second measurement configuration parameter from the source access device; measure a beam for the source access device in accordance with the second measurement configuration parameter, so as to acquire second measurement result data; and transmit the second measurement result data to the source access device. The second measurement result data may be used by the source access device to determine whether the measurement reference signal request message is to be transmitted to the target access device.

In a possible embodiment of the present disclosure, the second measurement configuration parameter may include measurement configurations about beams of a first type and beams of a second type for the source access device.

In a possible embodiment of the present disclosure, the processor 2050 is further configured to: receive a third measurement configuration parameter from the source access device; measure the beam for the target access device in accordance with the third measurement configuration parameter so as to acquire third measurement result data; and transmit the third measurement result data to the source access device. The third measurement result data may be used by the source access device to determine the target access device to which the measurement reference signal request message is to be transmitted.

In a possible embodiment of the present disclosure, the measurement reference signal request message may include a first initial configuration value, and the first initial configuration value may include target beam information about the measured beams of the first type in the third measurement result data. The target beam information may be used by the target access device to determine a to-be-measured beam in the measurement signal information.

In a possible embodiment of the present disclosure, the target beam information may include at least one of a reference signal port, a resource number, and a reference signal retransmission sequence number.

In a possible embodiment of the present disclosure, the measurement reference signal request message may further include a second initial configuration value. The second initial configuration value may include at least one of a measurement reference signal transmission interval, a beam transmission mode, a measurement reference signal effective time, and a measurement reference signal expiry date.

In a possible embodiment of the present disclosure, the measurement signal information may include a measurement configuration value to be configured by the target access device for the mobile terminal 2000 and/or an increment corresponding to the second initial configuration value.

According to the embodiments of the present disclosure, the mobile terminal may receive the first measurement configuration parameter from the source access device. The first measurement configuration parameter may be the measurement configuration parameter configured by the source access device for the mobile terminal in accordance with the measurement signal information included in a measurement reference signal response message, and the measurement reference signal response message may be the response message generated by the target access device upon the receipt of the measurement reference signal request message from the source access device. Next, the mobile terminal may measure the beam for the target access device in accordance with the first measurement configuration parameter so as to acquire the first measurement result data, and transmit the first measurement result data to the source access device. The first measurement result data may be used by the source access device to control the access and handover operation made by the mobile terminal. Through the interaction between the source access device and the target access device, the source access device may configure the beam measurement on the target access device for the mobile terminal, and determine the to-be-handed over access device in accordance with the beam measurement result about the target access device. As a result, it is able to improve the access and handover stability of the mobile terminal.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be used with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An access and handover method for use in a source access device for a mobile terminal, comprising:
    transmitting a measurement reference signal request message to at least one target access device when the mobile terminal meets a predetermined neighboring cell measurement condition;
    receiving a measurement reference signal response message from the at least one target access device, the measurement reference signal response message comprising measurement signal information provided by the at least one target access device to the mobile terminal;
    transmitting a first measurement configuration parameter to the mobile terminal in accordance with the measurement signal information, the first measurement configuration parameter being used by the mobile terminal to measure a beam for the at least one target access device;
    receiving first measurement result data from the mobile terminal, the first measurement result data being measurement data corresponding to the first measurement configuration parameter; and
    determining a to-be-handed over access device in accordance with the first measurement result data, and transmitting a handover request to the to-be-handed over access device.

2. The access and handover method according to claim 1, wherein the first measurement configuration parameter comprises measurement configurations about beams of a first type and/or a second type for the target access device, the beams of the first type comprise beams capable of being measured in accordance with a common signal to acquire received power, and the beams of the second type comprise beams capable of being measured in accordance with a dedicated reference signal to acquire received power.

3. The access and handover method according to claim 2, wherein the beams of the first type comprise wide beams, and the beams of the second type comprise narrow beams.

4. The access and handover method according to claim 2, wherein prior to transmitting the measurement reference signal request message to the at least one target access device when the mobile terminal meets the predetermined neighboring cell measurement condition, the access and handover method further comprises:
    transmitting a second measurement configuration parameter to the mobile terminal, the second measurement configuration parameter being used by the mobile terminal to measure a beam for the source access device;
    receiving second measurement result data from the mobile terminal, the second measurement result data being measurement data corresponding to the second measurement configuration parameter; and
    determining whether the mobile terminal meets the predetermined neighboring cell measurement condition in accordance with the second measurement result data.

5. The access and handover method according to claim 4, wherein the second measurement configuration parameter comprises measurement configurations about beams of a first type and beams of a second type for the source access device,
    wherein the determining whether the mobile terminal meets the predetermined neighboring cell measurement condition in accordance with the second measurement result data comprises:
    determining that the mobile terminal meets the predetermined neighboring cell measurement condition when the received second measurement result data comprises measurement results about the beams of the second type and measurement results about the beams of the first type.

6. The access and handover method according to claim 4, wherein prior to transmitting the measurement reference signal request message to the at least one target access device, the access and handover method further comprises:
 determining a target direction of the mobile terminal in accordance with the second measurement result data; and
 determining the at least one target access device in accordance with the target direction.

7. The access and handover method according to claim 4, wherein prior to transmitting the measurement reference signal request message to the at least one target access device, the access and handover method further comprises:
 determining a target direction of the mobile terminal in accordance with the second measurement result data;
 configuring a third measurement configuration parameter corresponding to beams of a first type for all to-be-handed over access devices in the target direction, the third measurement configuration parameter being used by the mobile terminal to measure the beams of the first type for the to-be-handed over access device;
 receiving third measurement result data acquired by the mobile terminal in accordance with the third measurement configuration parameter; and
 setting at least one to-be-handed over access device as the at least one target access device in accordance with the third measurement result data, the target access devices being top first predetermined quantity of devices in the to-be-handed over access devices ranked in a descending order of measurement results about the beams of the first type.

8. The access and handover method according to claim 7, wherein the measurement reference signal request message comprises a first initial configuration value, the first initial configuration value comprises target beam information about the measured beams of the first type in the third measurement result data, and the target beam information is used by the target access device to determine a to-be-measured beam in the measurement signal information.

9. The access and handover method according to claim 8, wherein the target beam information comprises at least one of a reference signal port, a resource number, and a reference signal retransmission sequence number.

10. The access and handover method according to claim 2, wherein the measurement reference signal request message further comprises a second initial configuration value, and the second initial configuration value comprises at least one of a measurement reference signal transmission interval, a beam transmission mode, a measurement reference signal effective time, and a measurement reference signal expiry date.

11. The access and handover method according to claim 10, wherein the measurement signal information comprises a measurement configuration value to be configured by the target access device for the mobile terminal and/or an increment corresponding to the second initial configuration value.

12. The access and handover method according to claim 2, wherein when the first measurement configuration parameter comprises a measurement configuration about the beams of the first type for the target access device but does not comprise a measurement configuration about the beams of the second type for the target access device, the to-be-handed over access devices comprise top second predetermined quantity of devices in the target access devices ranked in a descending order of the measurement results about the beams of the first type.

13. The access and handover method according to claim 2, wherein when the first measurement configuration parameter comprises a measurement configuration about the beams of the second type for the target access device but does not comprise a measurement configuration about the beams of the first type for the target access device, the to-be-handed over access devices comprise top third predetermined quantity of devices in the target access devices ranked in a descending order of the measurement results about the beams of the second type.

14. The access and handover method according to claim 2, wherein when the first measurement configuration parameter comprises the measurement configurations about the beams of the first type and the beams of the second type for the target access devices, the to-be- handed over access devices comprise top second predetermined quantity of devices in the target access devices ranked in a descending order of the measurement results about the beams of the first type for the target access devices, or top third predetermined quantity of devices in the target access devices ranked in a descending order of the measurement results about the beams of the second type for the target access devices, or top third predetermined quantity of devices in the target access devices ranked in a descending order of weighted values acquired after performing weighted summation on the measurement results about the beams of the first type and the beams of the second type for the target access devices.

15. The access and handover method according to claim 1, wherein the measurement reference signal request message and the measurement reference signal response message are transmitted between the source access device and the target access device via an Xn interface signaling.

16. A network side device for use in a source access device for a mobile terminal, comprising a memory, a processor, and a computer program stored in the memory and executed by the processor, wherein the processor is configured to execute the computer program so as to implement the access and handover method according to claim 1.

17. An access and handover method for use in a target access device for a mobile terminal, comprising:
 receiving a measurement reference signal request message from at least one source access device;
 transmitting a measurement reference signal response message in accordance with the measurement reference signal request message, the measurement reference signal response message comprising measurement signal information provided by the target access device to the mobile terminal, the measurement signal information being used by the source access device to configure a first measurement configuration parameter for the mobile terminal; and
 performing a beam training operation on a corresponding beam in the measurement signal information, to enable the mobile terminal to perform handover measurement on the beam in accordance with the first measurement configuration parameter.

18. A network side device for use in a target access device for a mobile terminal, comprising a memory, a processor, and a computer program stored in the memory and executed by the processor, wherein the processor is configured to execute the computer program so as to implement the access and handover method according to claim 17.

19. An access and handover method for use in a mobile terminal, comprising:
 receiving a first measurement configuration parameter from a source access device, the first measurement configuration parameter being a measurement configuration parameter configured by the source access device for the mobile terminal in accordance with measurement signal information comprised in a measurement reference signal response message, the measurement reference signal response message being a response message generated by a target access device upon the receipt of a measurement reference signal request message from the source access device;

measuring a beam for the target access device in accordance with the first measurement configuration parameter so as to acquire first measurement result data; and transmitting the first measurement result data to the source access device, the first measurement result data being used by the source access device to control an access and handover operation made by the mobile terminal.

20. A mobile terminal, comprising a memory, a processor, and a computer program stored in the memory and executed by the processor, wherein the processor is configured to execute the computer program so as to implement the access and handover method according to claim 19.

* * * * *